United States Patent [19]
Bruner et al.

[11] Patent Number: 5,594,661
[45] Date of Patent: Jan. 14, 1997

[54] METHOD FOR INTERFACING WITH A MULTI-MEDIA INFORMATION SYSTEM

[75] Inventors: Nancy J. Bruner; Patricia L. Smith, both of Denver, Colo.

[73] Assignee: U. S. West Marketing Resources Group, Inc., Englewood, Colo.

[21] Appl. No.: 311,531

[22] Filed: Sep. 23, 1994

[51] Int. Cl.$^6$ .................................................. H04N 9/00
[52] U.S. Cl. ........................................ 364/514 R; 395/615
[58] Field of Search .......................... 364/514 R, 401, 364/407; 348/7, 6, 13; 455/4.1, 4.2, 5.1; 235/381; 395/600

[56] References Cited

U.S. PATENT DOCUMENTS

| | | | |
|---|---|---|---|
| 4,805,134 | 2/1989 | Calo et al. | 364/514 H |
| 5,408,417 | 4/1995 | Wilder | 364/479 |
| 5,416,508 | 5/1995 | Sukuwa et al. | 348/3 |
| 5,481,542 | 1/1996 | Logstou et al. | 370/94.2 |
| 5,483,278 | 1/1996 | Strubbe et al. | 348/7 |

*Primary Examiner*—Emanuel T. Voeltz
*Assistant Examiner*—Thomas Peeso
*Attorney, Agent, or Firm*—Judson D. Cary

[57] ABSTRACT

A method for processing selections identified by a user in an interactive multi-media information system. The interactive multi-media information system includes a processor, a memory, a display device and an input device having a plurality of alpha-numeric keys. The identification of user selections is accomplished utilizing the input device. The method includes the step of retrieving from the memory a first set of digital data representing a first multi-media program. The method continues with the step of displaying the first multi-media program on the display device. The method further includes the step of prompting the user to press an alpha-numeric key on the input device to receive multi-media information regarding a selection. The method concludes with the steps of receiving a signal representing the alpha-numeric key and displaying multi-media information regarding the identified selection.

16 Claims, 33 Drawing Sheets

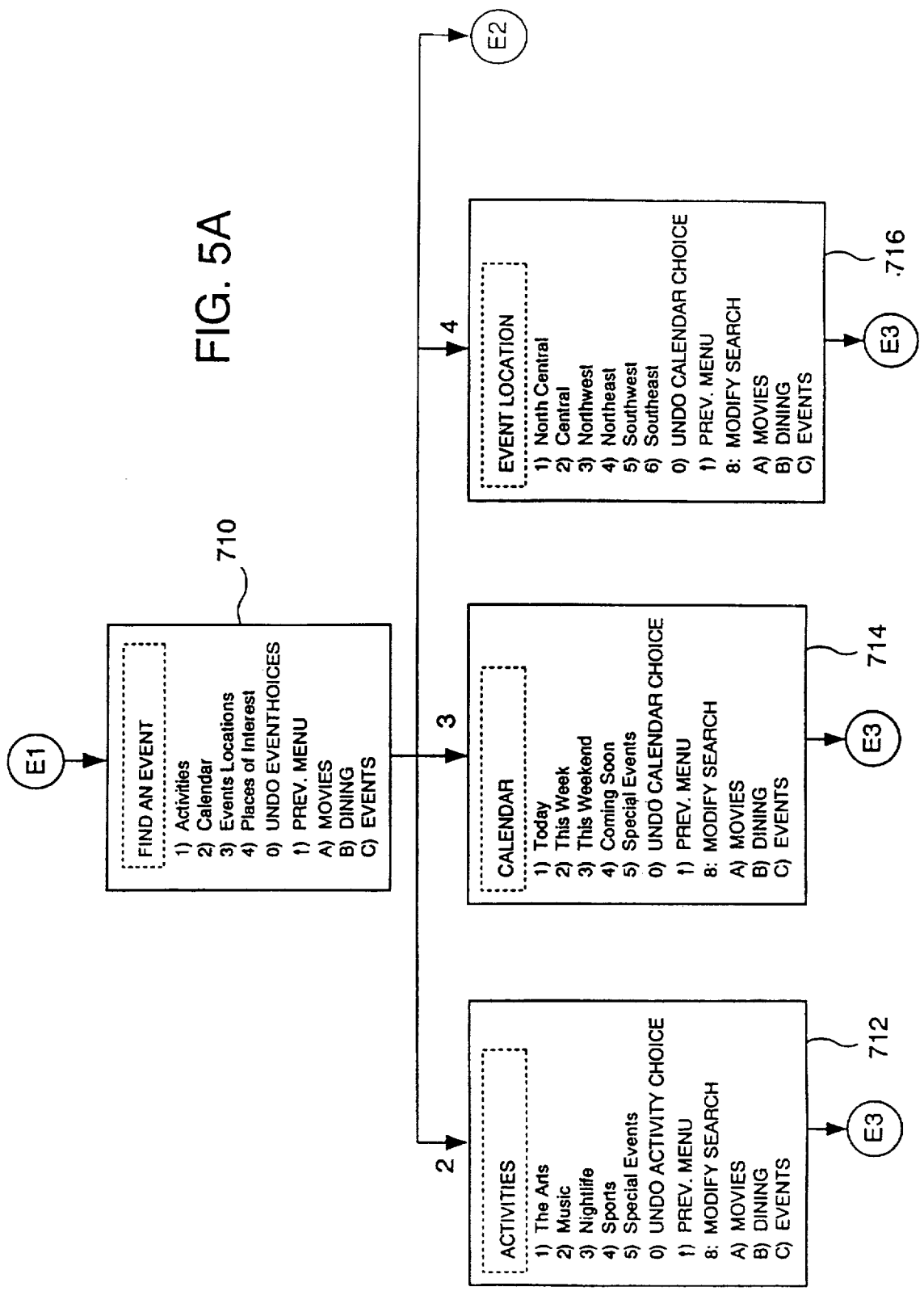

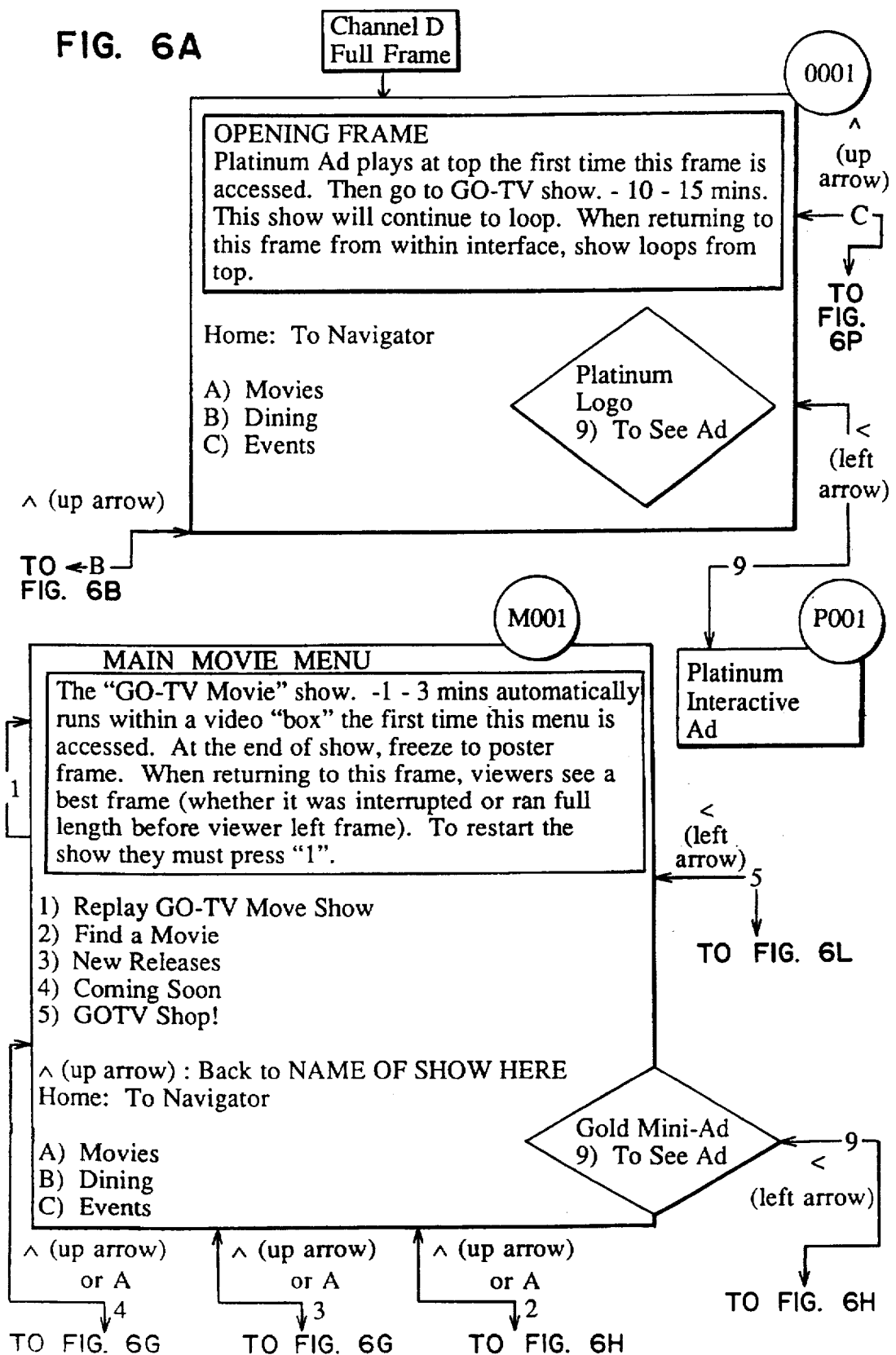

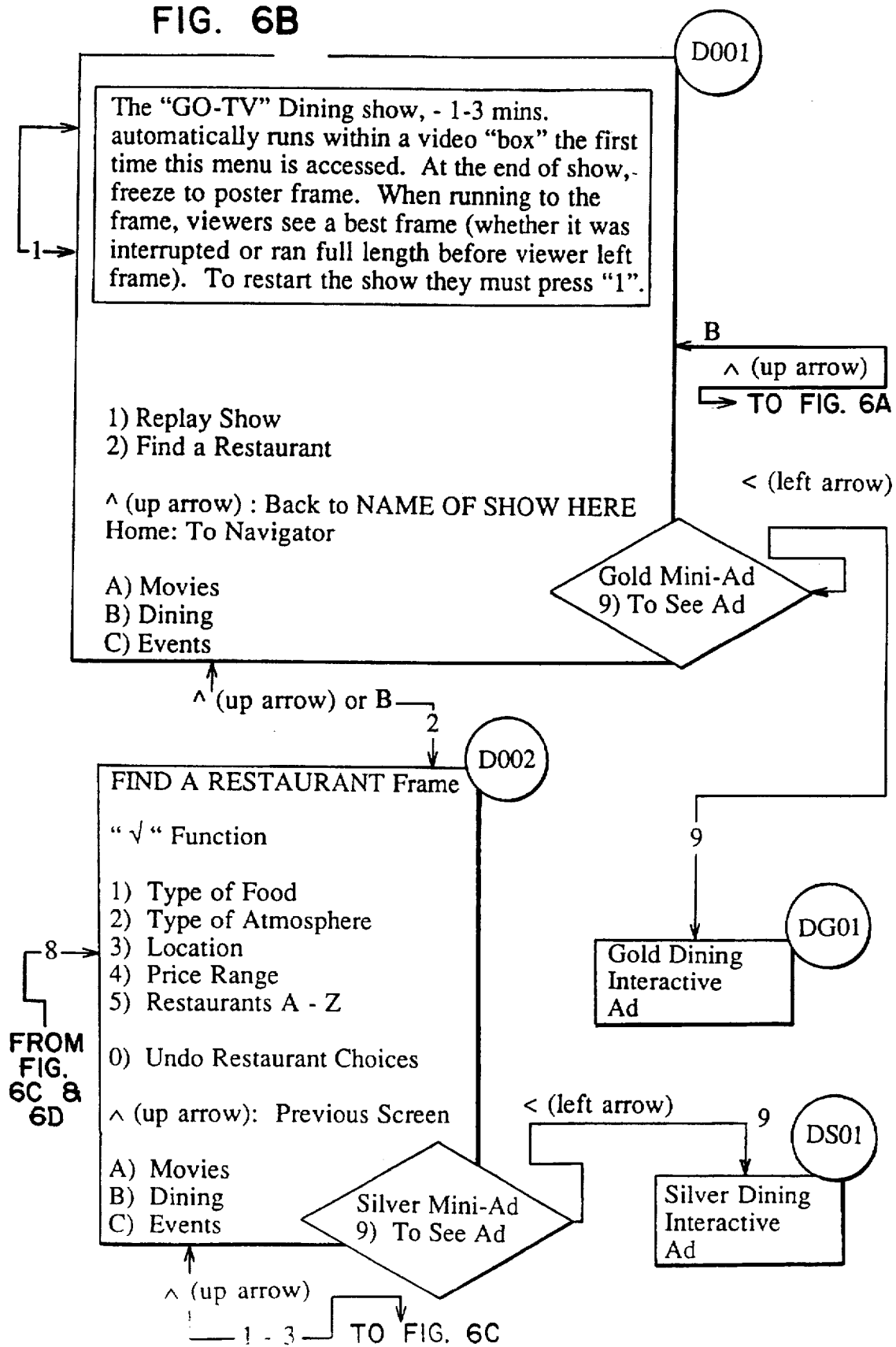

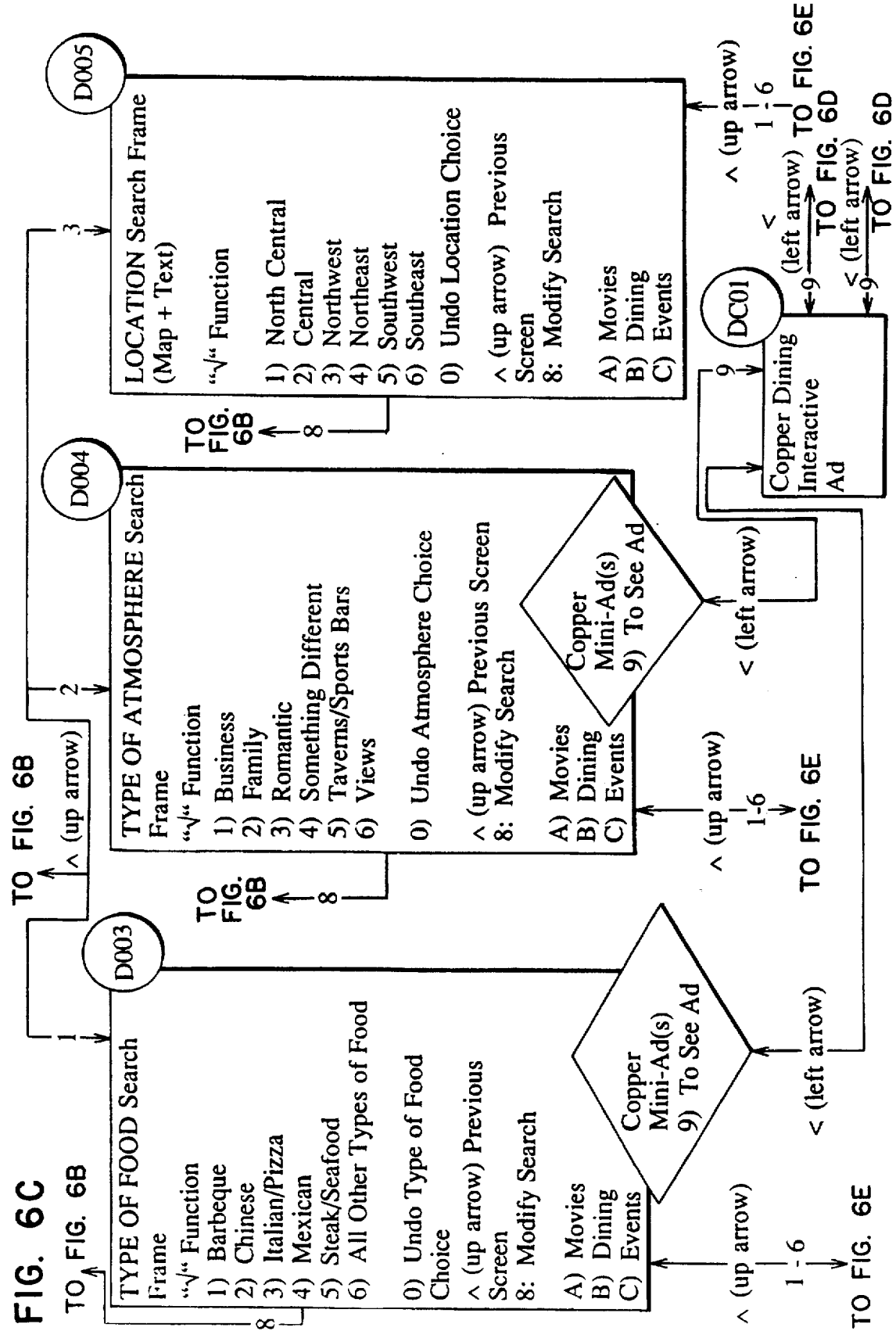

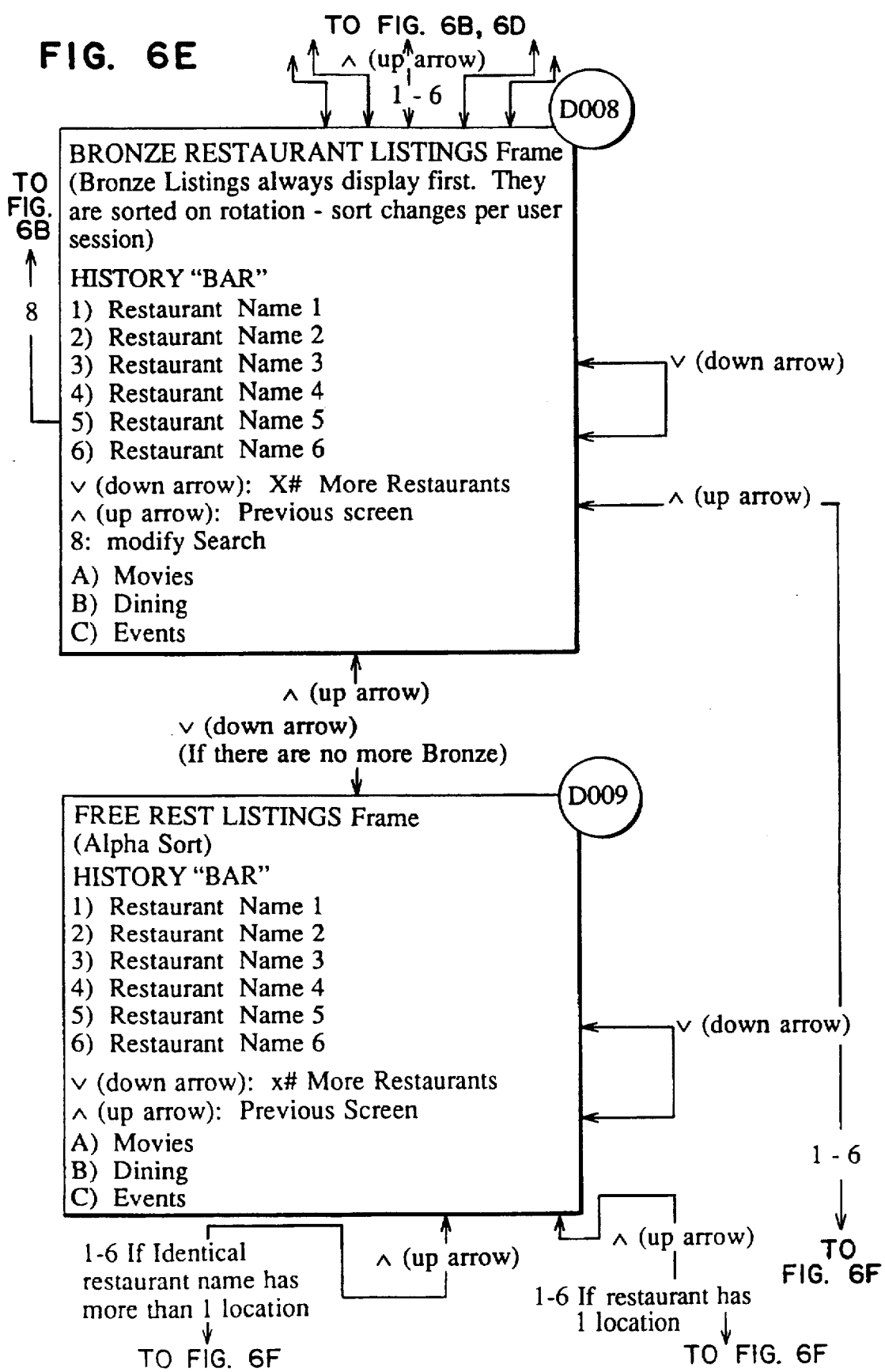

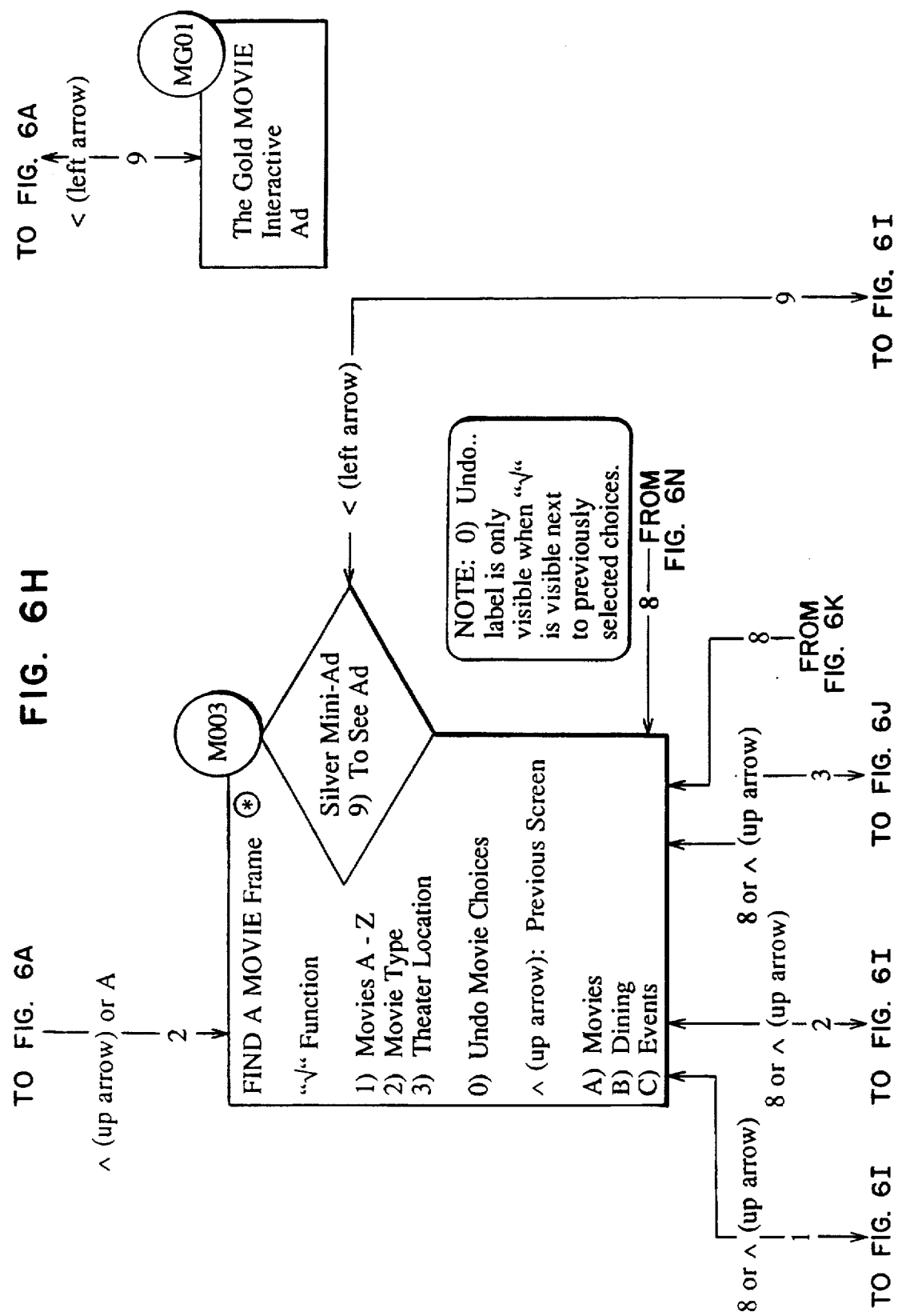

FIG. 6J

TO FIG. 6H
↑
| 8 or ∧ (up arrow)
3
↕

M007

THEATER LOCATION Search Frame
(Map + Text)

"√" Function

1) North Central
2) Central
3) Northwest
4) Northeast
5) Southwest
6) Southeast

0) Undo Theater Location Choice
∧ (up arrow) Previous Screen
8: Modify Search

A) Movies
B) Dining
C) Events

↑
∧ (up arrow)

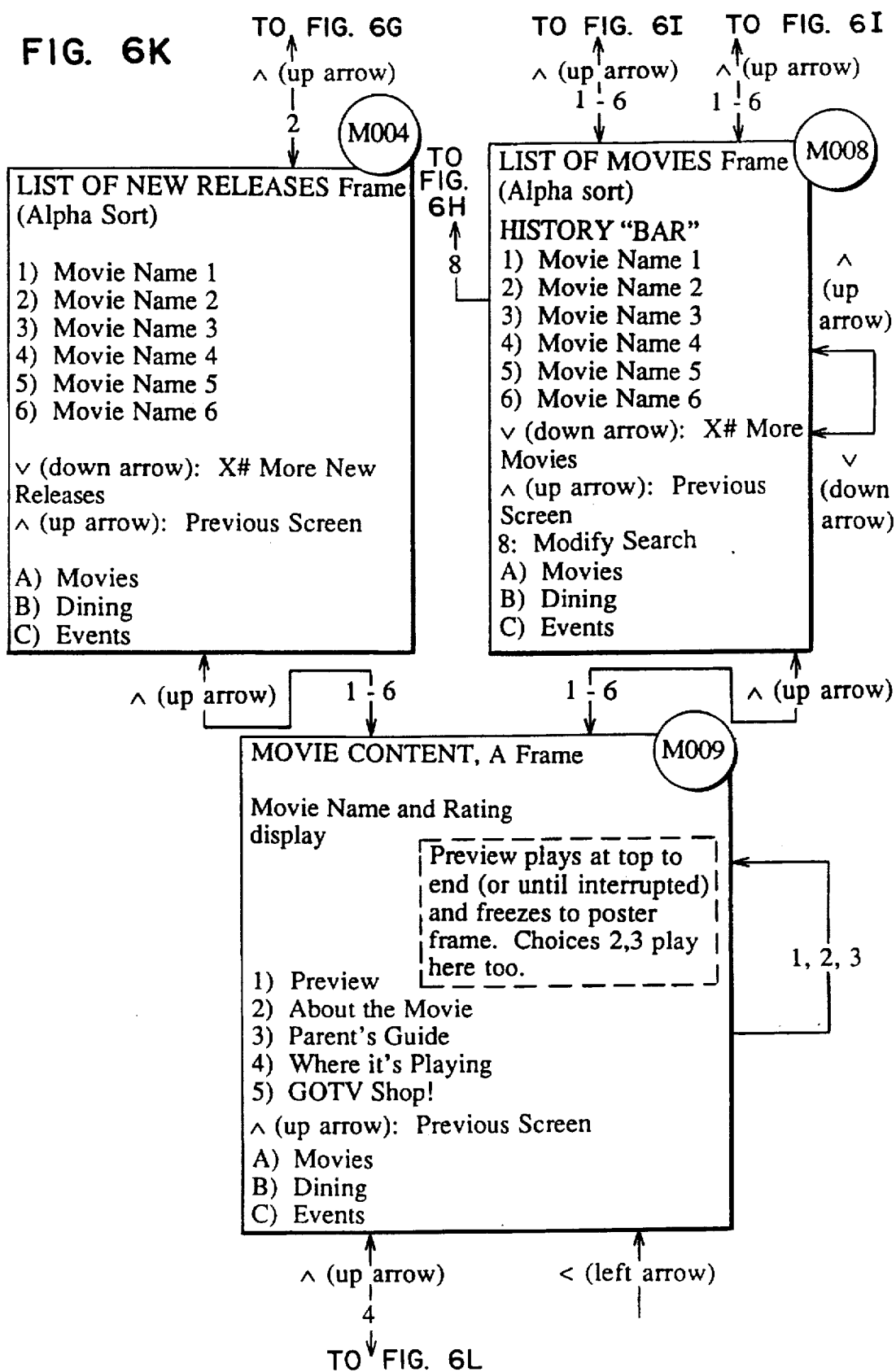

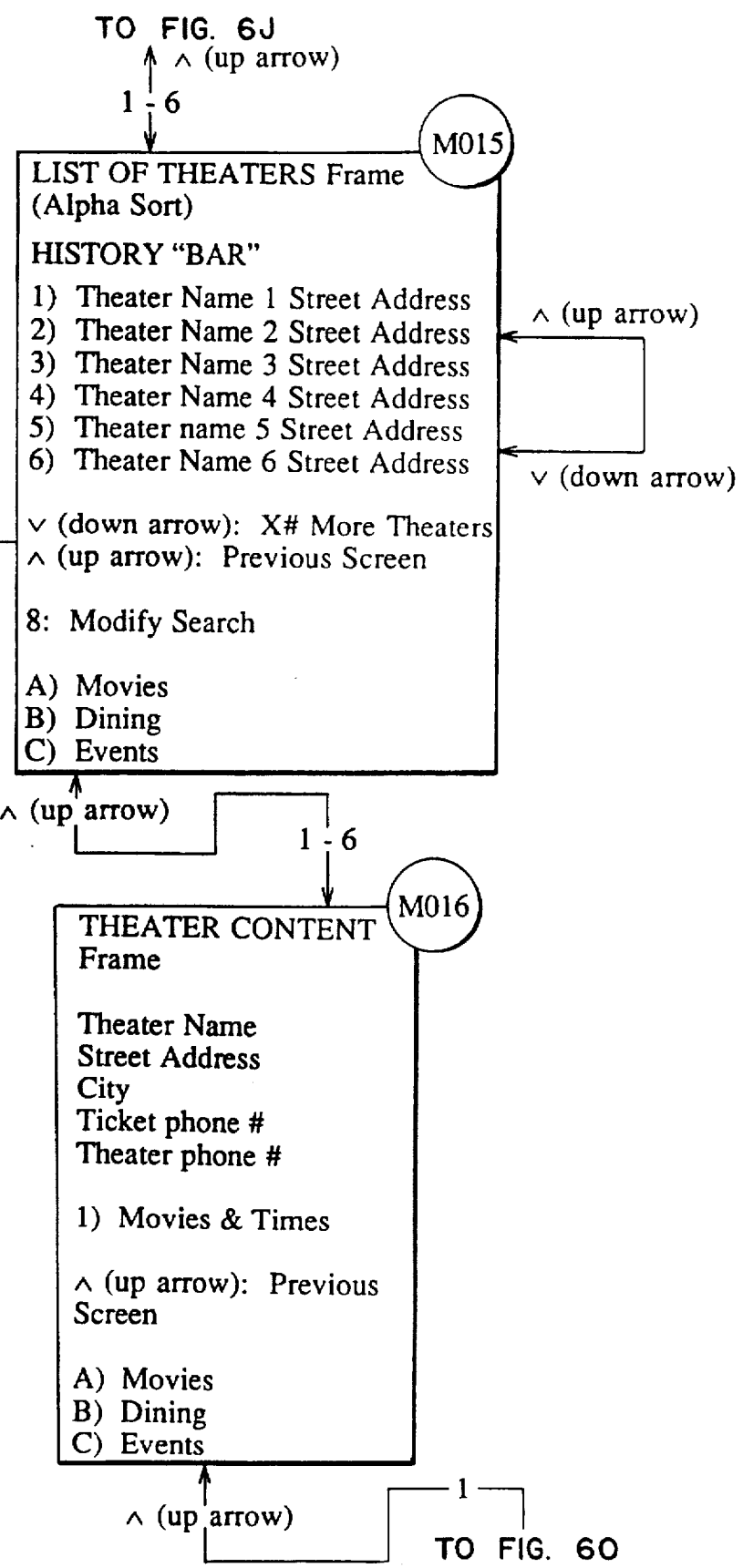

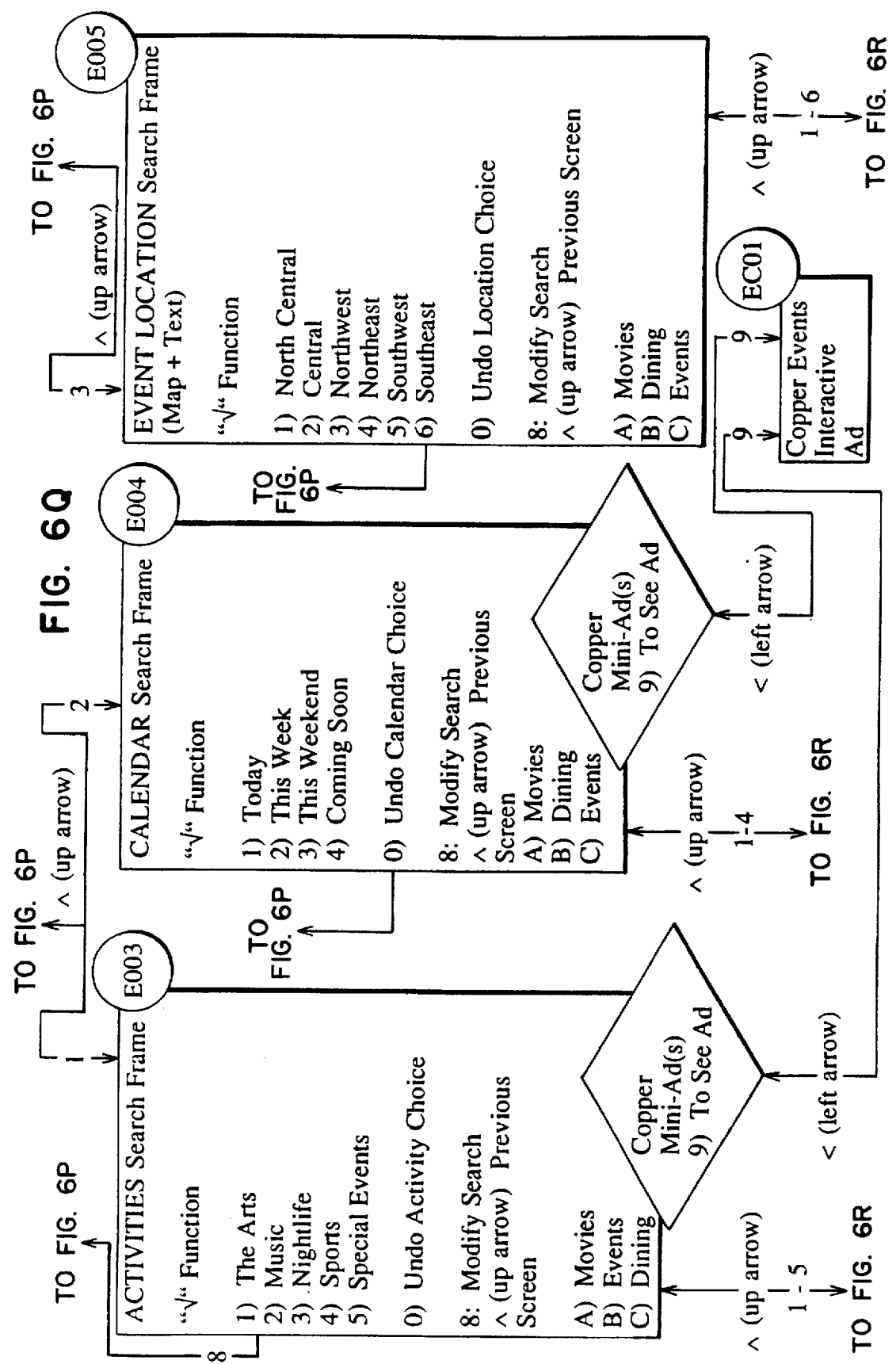

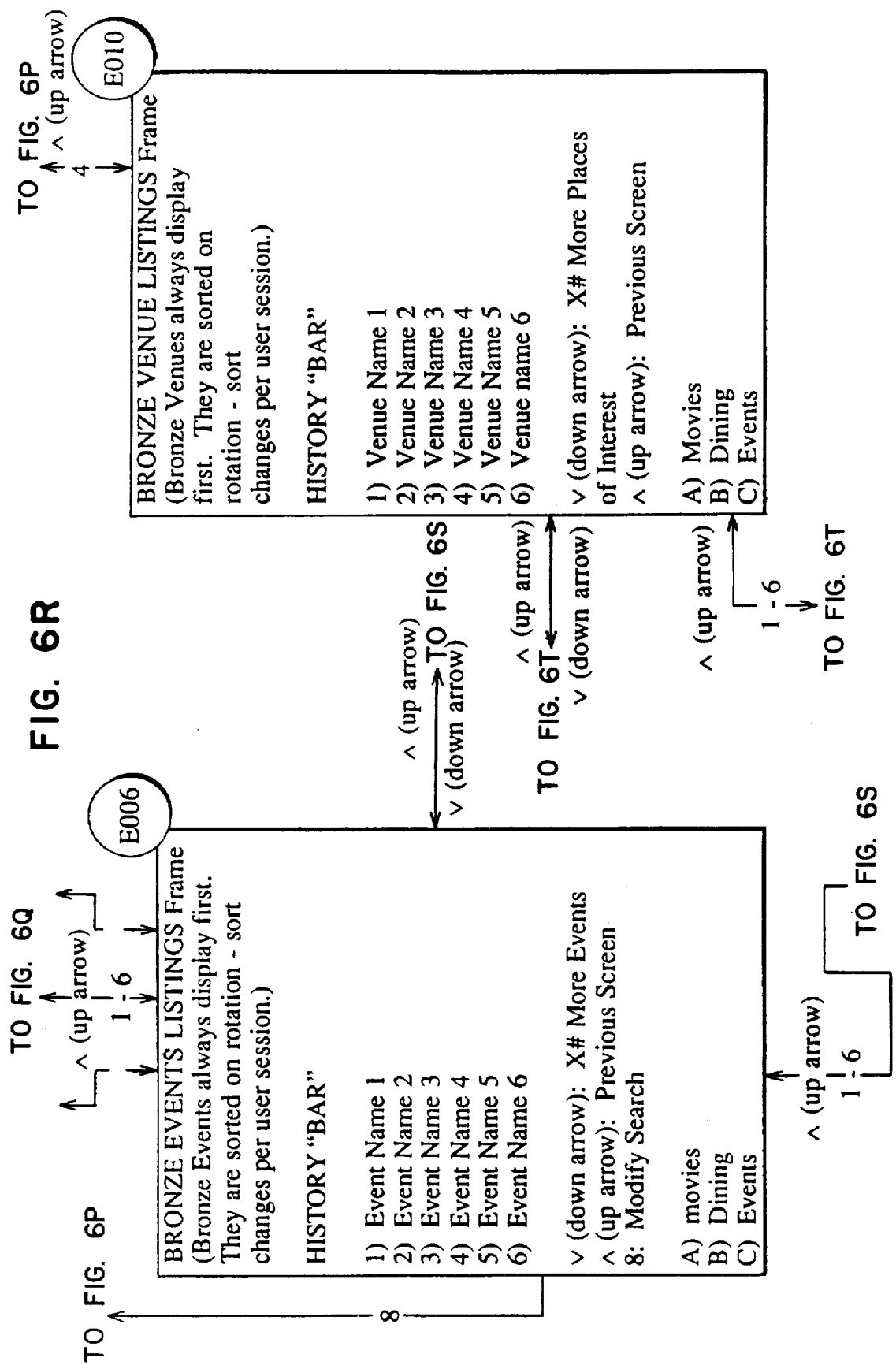

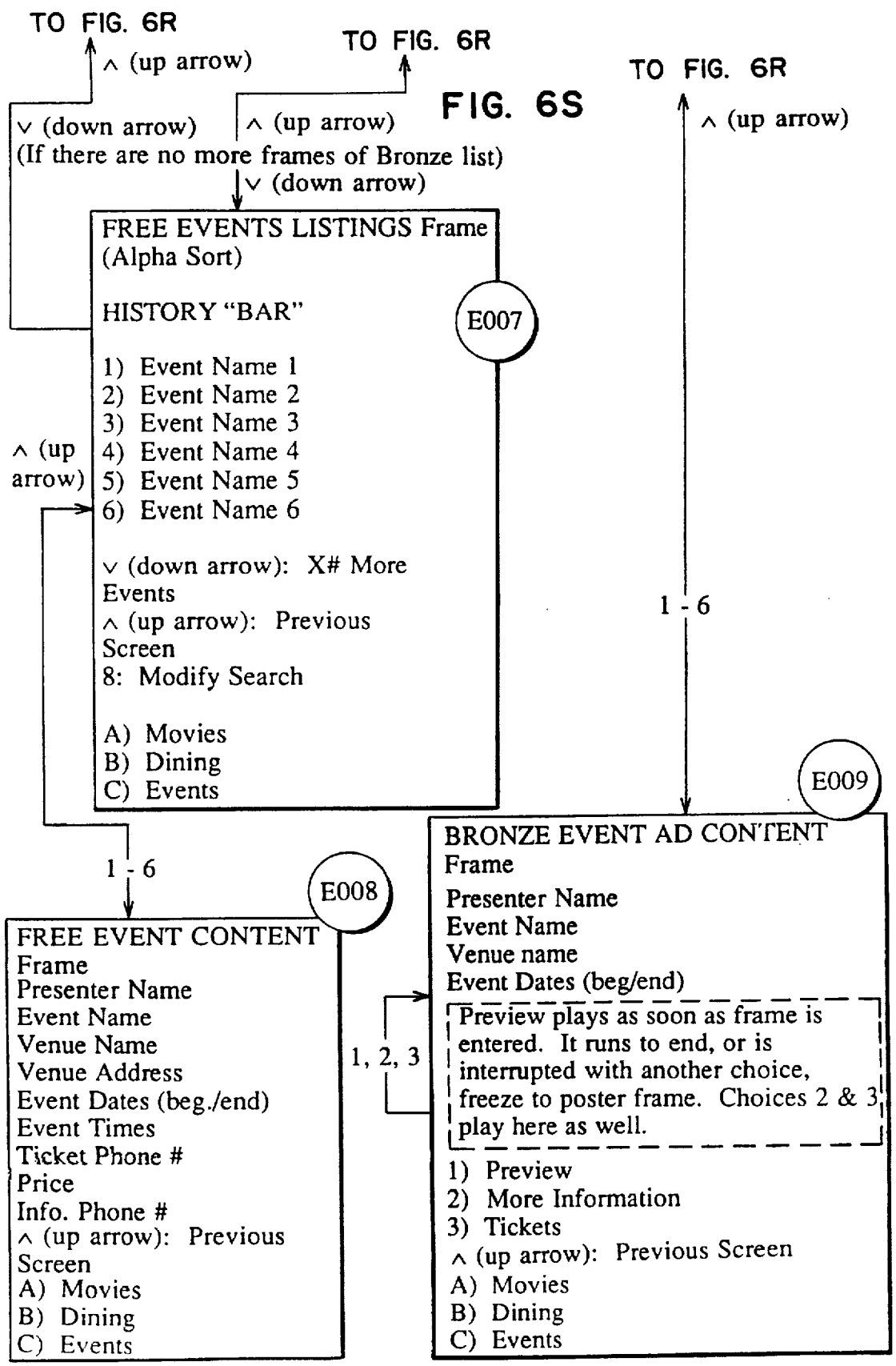

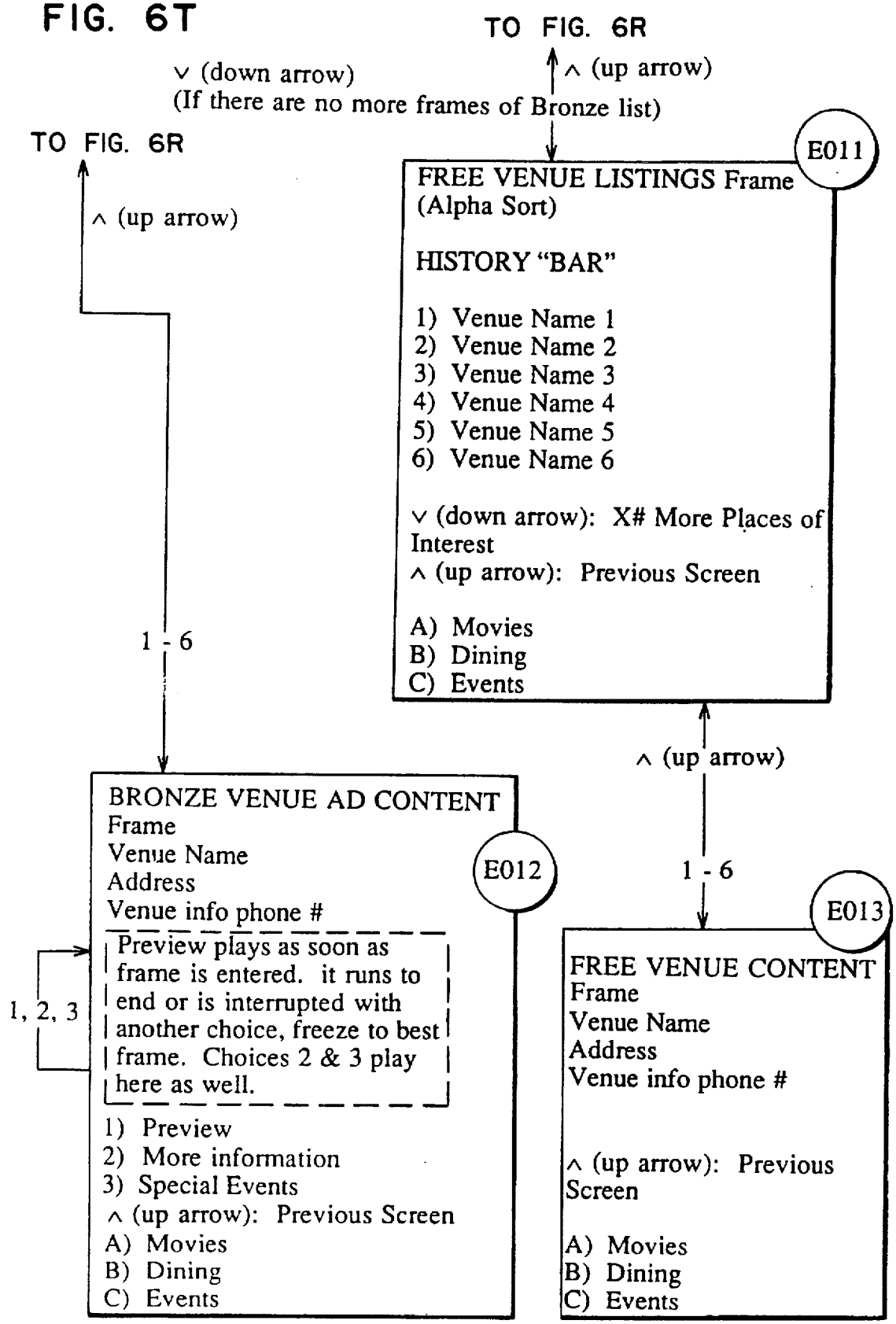

METHOD FOR INTERFACING WITH A MULTI-MEDIA INFORMATION SYSTEM

TECHNICAL FIELD

The present invention relates generally to methods for providing an interface between a user and an information system. More particularly, the invention relates to methods for processing user selections at an interactive multi-media information system.

BACKGROUND ART

Recently, the development of interactive multimedia information systems has increased dramatically. Such systems specifically provide a man-machine interface to allow the user to accomplish a variety of tasks. A need presently exists for an effective user interface which is intuitive and easy to use.

DISCLOSURE OF THE INVENTION

It is a principle object of the present invention to provide a method for processing a user selection for use in an interactive multi-media information system. Multi-media information incorporates all media formats commonly known in the art, including: audio, video, graphics, text, still photographs and animation.

It is a further object of the present invention to provide a method as above which is specifically directed for use in cooperation with an intuitive user interface.

In carrying out the above-stated objects and other objects, features and advantages of the present invention, there is provided a method for processing selections identified by a user utilizing an input device.

The method is directed for use in cooperation with an interactive multi-media information system, as indicated above. The system includes a processor, a memory, a display device and an input device having a plurality of alpha-numeric keys.

The method includes the steps of retrieving from the memory a first set of digital data representing a first multi-media program and displaying the first multi-media program on the display device. The first multi-media program preferably communicates introductory and instructional information related to the information service.

The method further includes the step of prompting the user to press an alpha-numeric key on the input device. Pressing the alpha-numeric key enables the user to receive multi-media information regarding a selection of an information service function. Thereafter, the method includes the step of receiving a signal representing the alpha-numeric key.

Finally, multi-media information is displayed on the display device. The information corresponds to the selection identified by the user.

The above objects and other objects, features, and advantages of the present invention are readily apparent from the following detailed description of the best mode for carrying out the invention when taken in connection with the accompanying drawings wherein like reference numerals correspond to like components.

BRIEF DESCRIPTION OF THE DRAWINGS

FIGS. 5a–5c are flow charts illustrating the processing of user requests related to events.

BEST MODES FOR CARRYING OUT THE INVENTION

Figure 1:
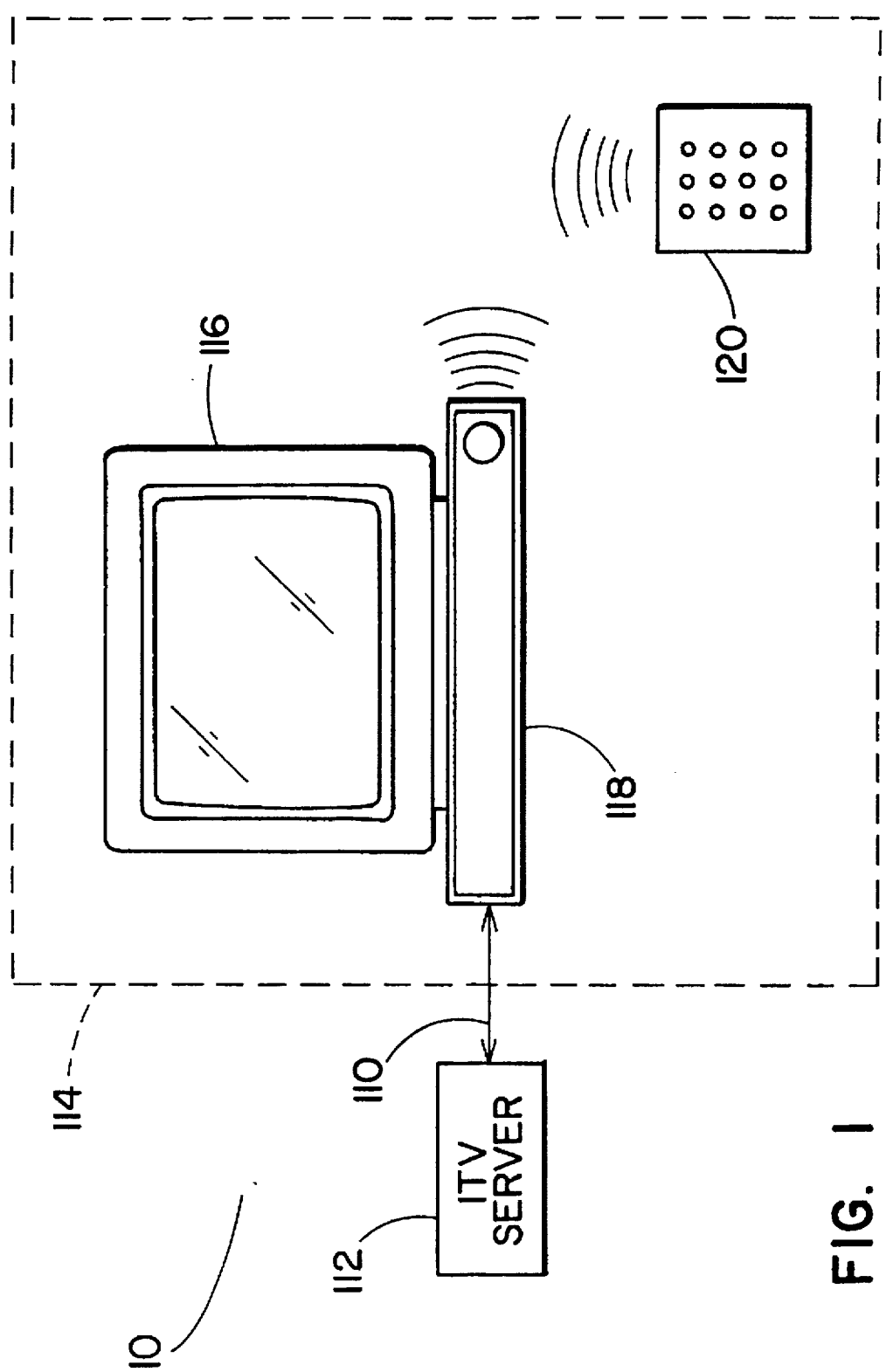
FIG. 1 is a schematic block diagram of the preferred embodiment in which the present invention is used.

Referring to FIG. 1, there is shown a schematic block diagram of an interactive television system 10 for use with the present invention. System 10 includes an interactive television ("ITV") server 112 for use in an interactive television network. ITV server 112 is connected with customer premises equipment ("CPE") 114 of the subscriber over communication line 110. Preferably, communication line 110 is a fiber optic cable.

The preferred CPE 114 of the present invention is a Silicon Graphics Smart Set-Top (SST) prototype. The SST employs a MIPS R4000 chip running at 80–100 Mhz and incorporates Silicon Graphics Indigo Workstation components. The SST is capable of delivering full-motion animation and graphics overlaid on a televised or digital image.

CPE 114 includes a display device or monitor 116. To provide the highest resolution, display device 116 is preferably a video monitor however, a standard television is acceptable. CPE 114 further includes interactive television controller 118 having a processor and memory. CPE 114 also includes input device 120. Preferably input device 120 is an infrared remote control including a number of alpha-numeric keys to facilitate user selection. As those skilled in the art will recognize, system 10 is an interactive television network employing a client-server architecture. ITV server 112 provides mass storage and services to CPE 114. Control logic resides at both server 112 and CPE 115 to support the client-server architecture.

Although the preferred embodiment will be described for use in an interactive television environment, the present invention is equally well-suited to a CD ROM interactive system, a stand alone kiosk for use in a public facility, or any other such digital interactive information system. In addition, it is envisioned that the method of the present invention is well-suited to a variety of input devices. The method of the present invention is envisioned to operate with a touch sensitive screen, joy stick, mouse, or other conventional input device.

Figure 2:
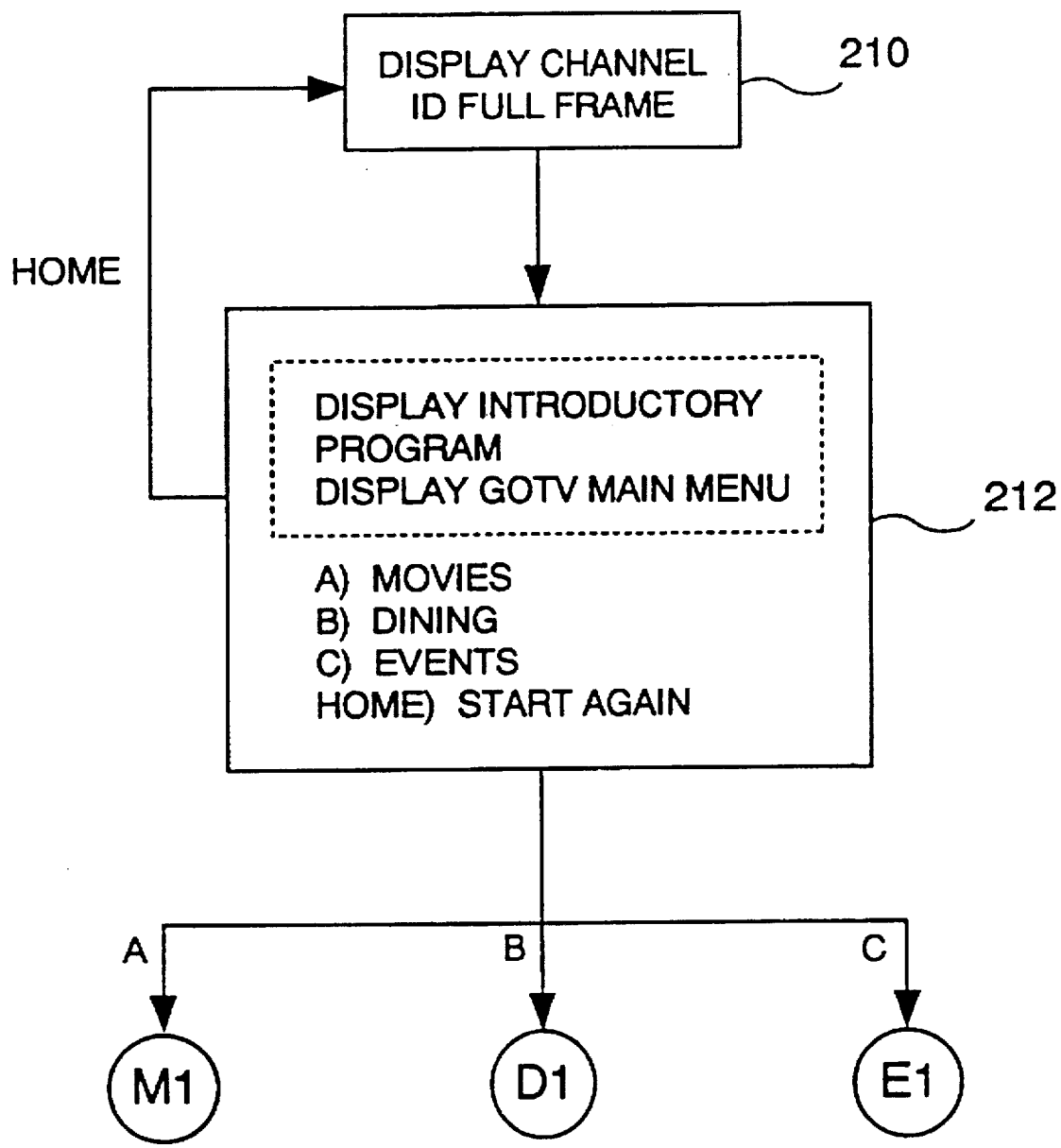
FIG. 2 is a flow chart illustrating the initial operation of an interactive television system.

Referring now to FIG. 2, there is illustrated a flow chart depicting the operation of GO-TV, the preferred embodiment. GO-TV is a registered trademark of U S West. Upon identifying a user request to view an interactive television channel CPE 114 processes block 210. Such processing results in a full frame channel ID being displayed on monitor 116. CPE 114 next processes block 212, wherein an introductory program is displayed on monitor 116.

The introductory program is stored in digital form at ITV server 112 and is transferred to CPE 114 upon request. The introductory program runs for approximately three minutes and contains entertainment or instructional information. Preferably, the introductory program, like all other programs displayed by CPE 114, is displayed in a program window occupying a portion of the display screen of monitor 116. At the conclusion of the program, one frame of the program is "frozen" and remains displayed in the program window.

Preferably, in an area of the display screen not occupied by the program window, CPE 114 displays the GO-TV main menu illustrated at block 212.

During the display of the introductory program, the user may select one of the displayed menu options: A) movies, B) dining or C) events. The user indicates her selection by pressing a corresponding alpha-numeric key on remote control 120.

Upon receiving a user selection, CPE 114 can provide either a visual or audible indication (or both) of the selection. This allows the user to verify that her selection has been received by CPE 114. Processing of each option is described more fully with regard to FIGS. 3a–5c below.

Requests For Movies

Referring now to FIGS. 3a–3e, there is illustrated the processing steps associated with a user request for information related to movies.

Upon receiving a user selection of "A" from the GO-TV main menu, indicating a request for information related to movies, CPE 114 will process block 310. According to block 310, CPE 114 will request and display a program related to movies on monitor 116. CPE 114 will further display the movies main menu of options listed in block 310.

The movies main menu, like a number of other menus in the GO-TV system, provides a number of standard features. Using the "↑" key, the user can return to the previous menu. Using the "A", "B" or "C" keys of remote controller 120, the user is able to receive information related to movies, dining and events, respectively. By pressing the "home" key, the user may restart her GO-TV session, causing CPE 114 to process block 210.

Upon receiving a user selection of "1" from the movies main menu, CPE 114 will redisplay the movies information program. This enables the user to review the program whenever she desires.

Upon receiving a user selection of "2" from the movies main menu, CPE 114 will process block 312. According to block 312, CPE 114 will display the Find-A-Movie menu on monitor 116. Processing of each option from this menu is more fully described with regard to FIGS. 3d and 3e below.

Upon receiving a user selection of "3" from the movies main menu, CPE 114 will process block 314. According to block 314, CPE will request and display a program related to recent movie releases. The CPE 314 will further display the new release menu of options listed in block 314.

Upon receiving a user selection of "2" from the new release menu, CPE 114 will process block 318. According to block 318, CPE 114 will display a new release list including up to six movie titles. If the list of movie titles exceeds six entries the user may view additional entries by pressing the "↓" key of remote controller 120.

Upon receiving a user selection of "1–6" from the new release menu, CPE 114 will process block 320. According to block 320, CPE 114 will request and display a preview program related to the selected new release. CPE 114 will further display the name and rating of the identified movie, as well as a preview menu. Processing of each option on the preview menu is more fully described with regard to FIG. 3c below.

Upon receiving a user selection of "4" from the movies main menu, CPE 114 will process block 316. According to block 316, CPE 114 will request and display a program related to future movie releases. CPE 114 will further display the "coming soon" menu of options listed in block 316.

Figure 3A:
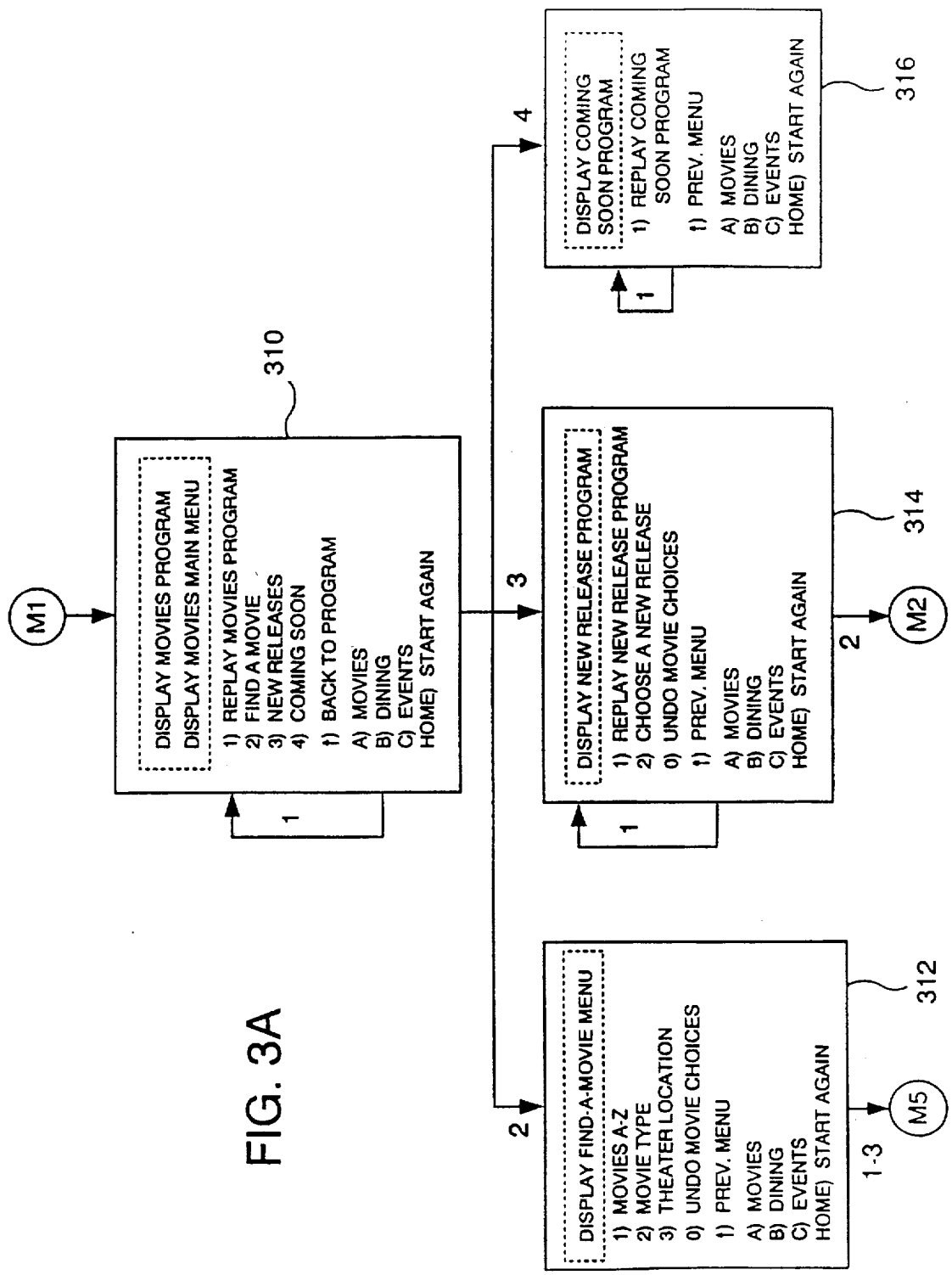
FIGS. 3a–3f are flow charts illustrating the processing of user requests related to movies.
Figure 3B:
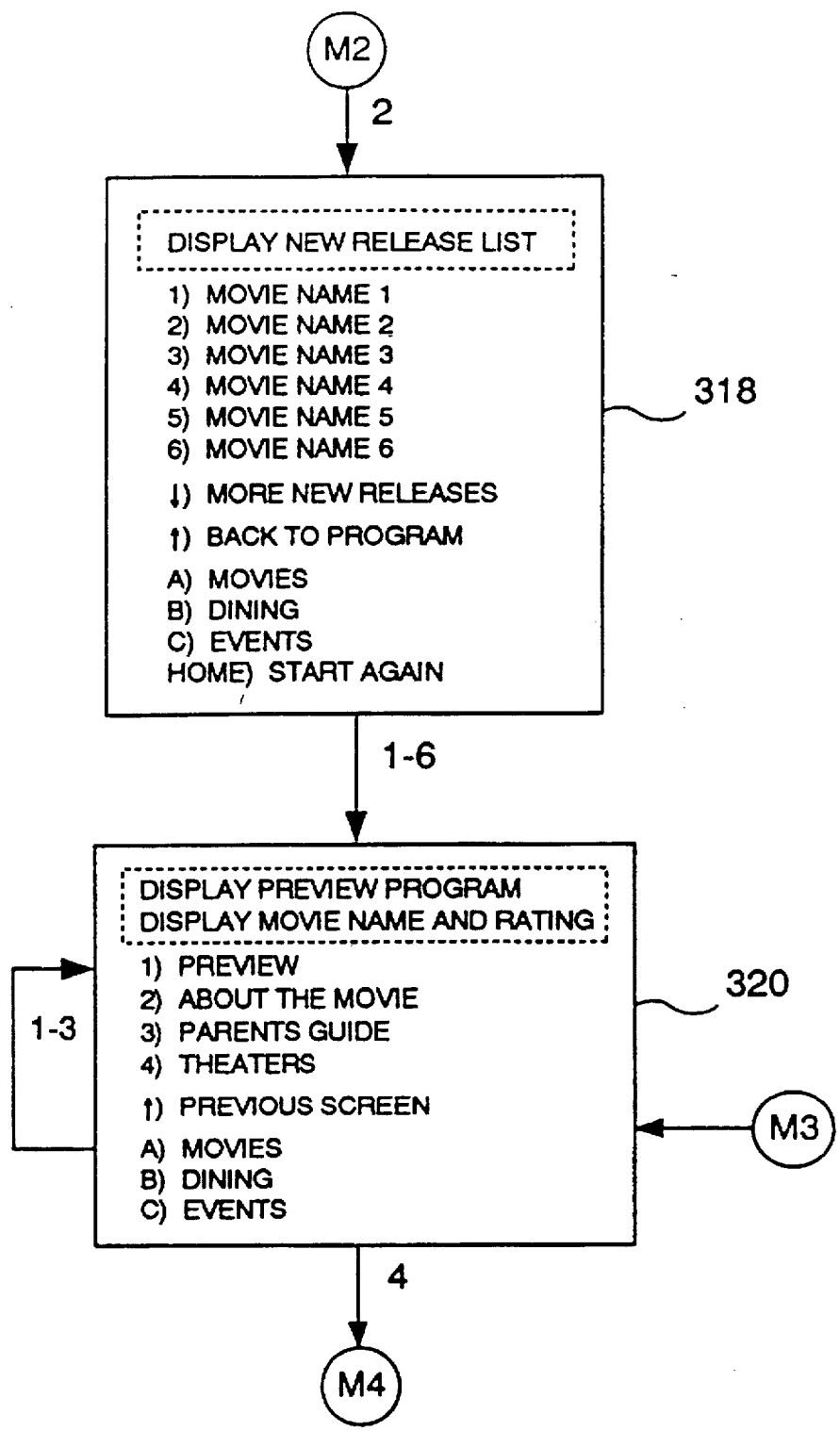
Figure 3C:
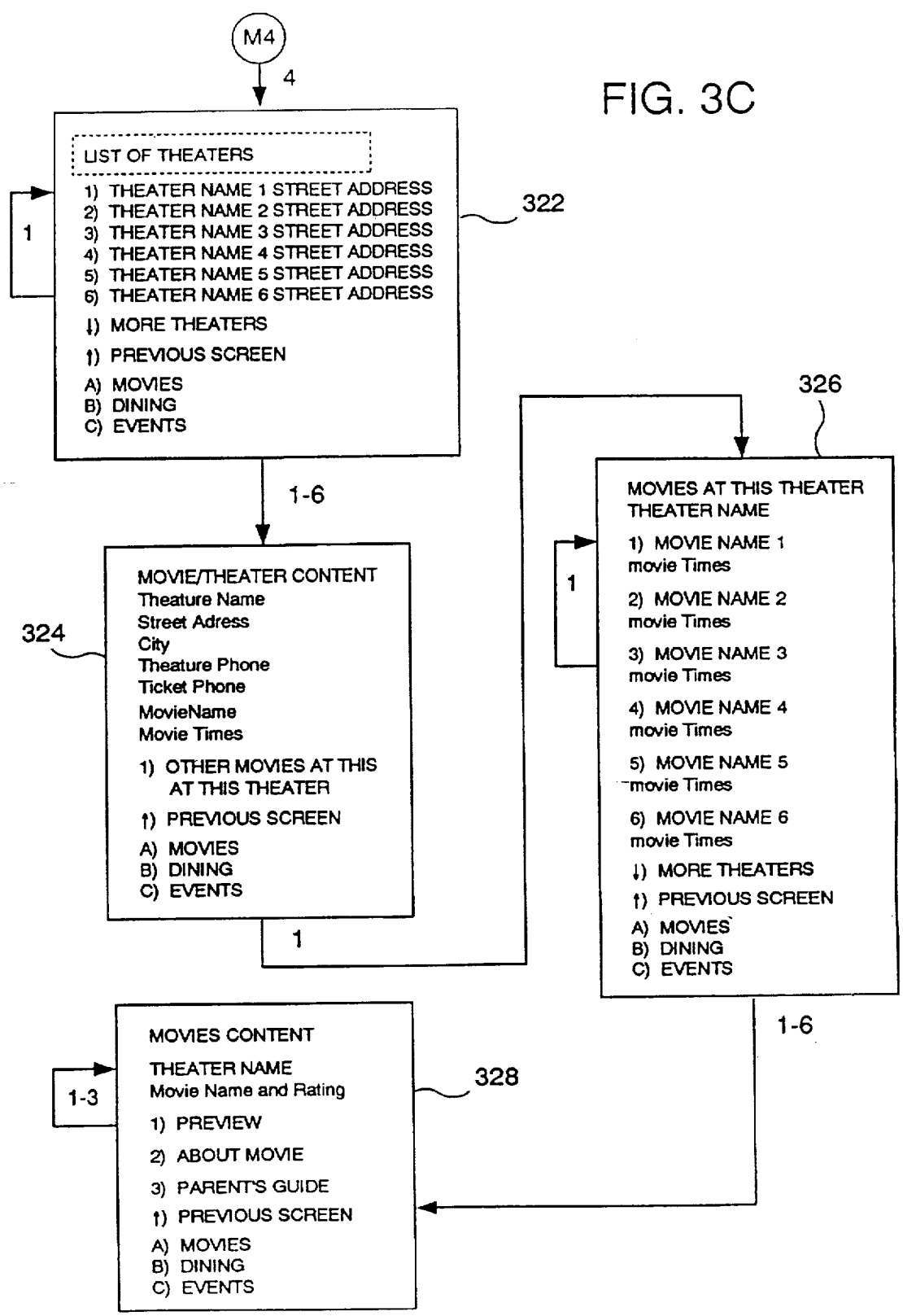

Referring now to FIG. 3c, there is illustrated the processing steps associated with a user request relating to a selected new release.

Upon receiving a user selection of "1", indicating a request to view a preview of a new release, CPE 114 will request and display a program previewing the new release. Upon receiving a user selection of "2" from menu 320, CPE 114 will request and display a program related to or describing the production of the new release. This selection would allow the user to view video clips regarding behind the scenes activities during the filming of the new release. This selection may also include interviews with actors, actresses, directors, or other production staff members involved with the production of the new release.

Upon receiving a user selection of "3" from menu 320, indicating a request to view a video parents guide, CPE 114 will request and display a program related to the identified new release containing information of interest to parents and guardians of children.

This selection enables a viewer to receive detailed ratings of the identified new release. This selection may provide factual details of sexually explicit or violent scenes in the identified new release. In addition, this selection may provide information regarding the use of profanity and the implications of off camera activities depicted in the new release. This selection represents an important source of information to assist a consumer in making educated entertainment choices.

Upon receiving a user selection of "4" from menu 320 indicating a request for theater locations currently showing the new release, CPE 114 will process block 322. According to block 322, CPE 114 will display a list of theaters, including up to six theater names and addresses. If the list of theaters exceeds six entries, the user may view additional entries by pressing the "↓" key of remote controller 120.

Upon receiving a user selection of "1–6" from the list of theaters 322, CPE 114 will process block 324. According to block 324, CPE 114 will display pertinent movie theater information, including theater name, street address, city, theater phone number, ticket phone number, movie name, and show times. CPE 114 will further display the menu of options shown by block 324.

Upon receiving a user selection of "1" from the theater content menu, CPE 114 will process block 326. Block 326 provides a list of movies currently showing at the identified theater. The movie list includes up to six movie titles. If the list of movie titles exceeds six entries, the user may view additional entries by pressing the "↓" key of remote controller 120. The user may request additional information regarding any of the identified movies by pressing the corresponding alpha-numeric key of remote controller 120.

Upon receiving a user selection of "1–6" from the menu of block 326, CPE 114 will process block 328. According to block 328, CPE 114 will request and display a program previewing the identified movie. CPE 114 will further display a menu of options similar to the options displayed at block 320.

Figure 3D:
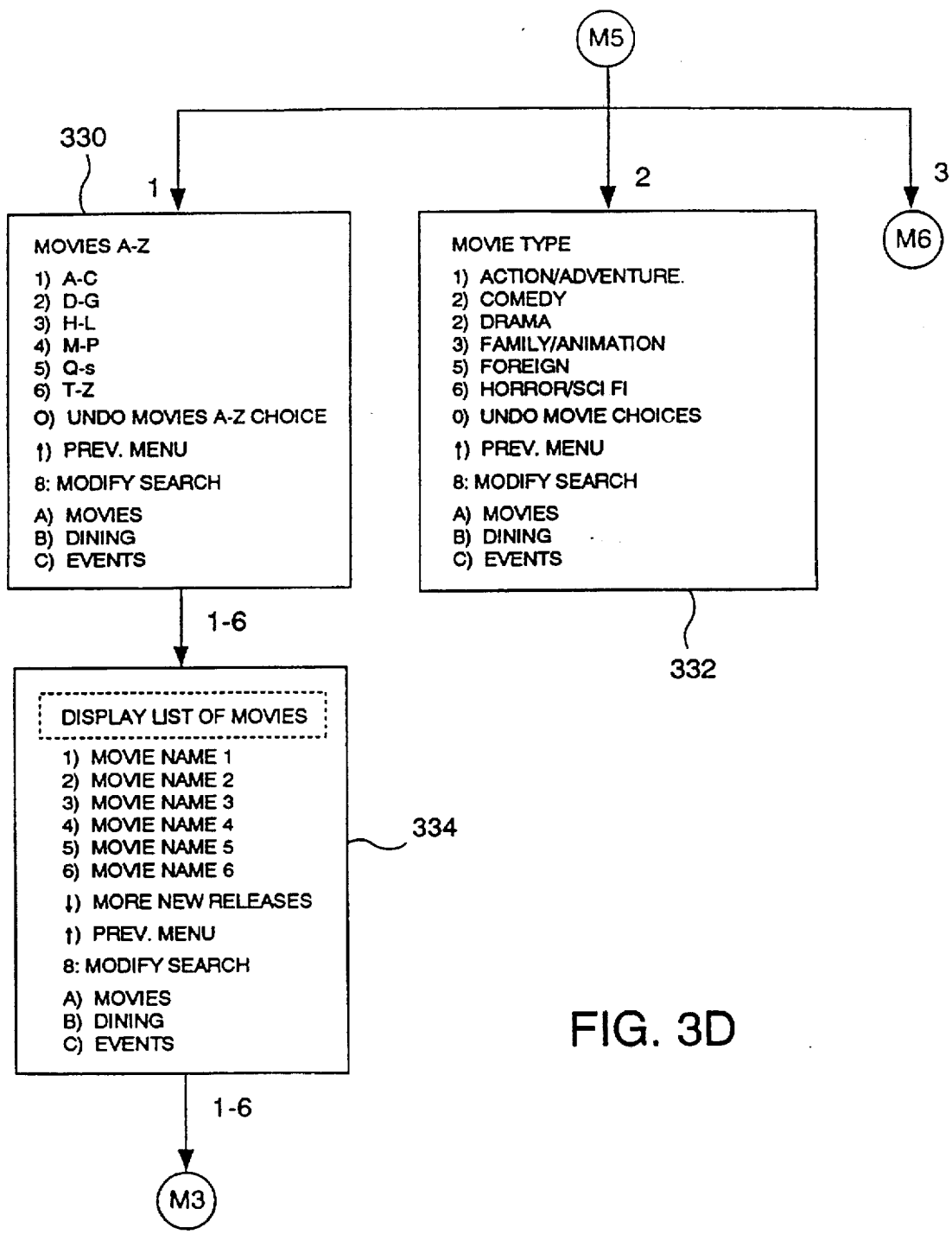
Figure 3E:
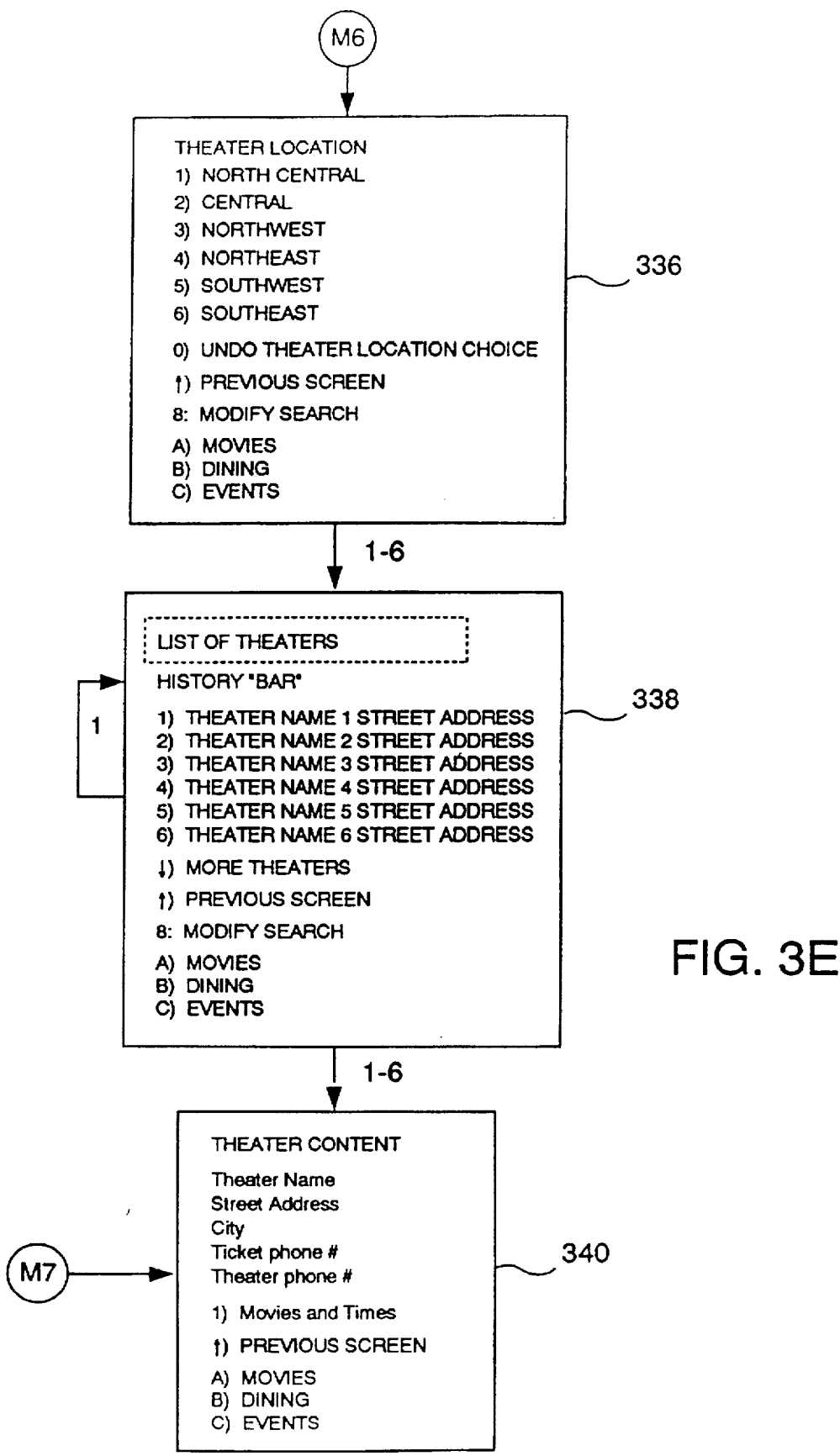
Figure 3F:
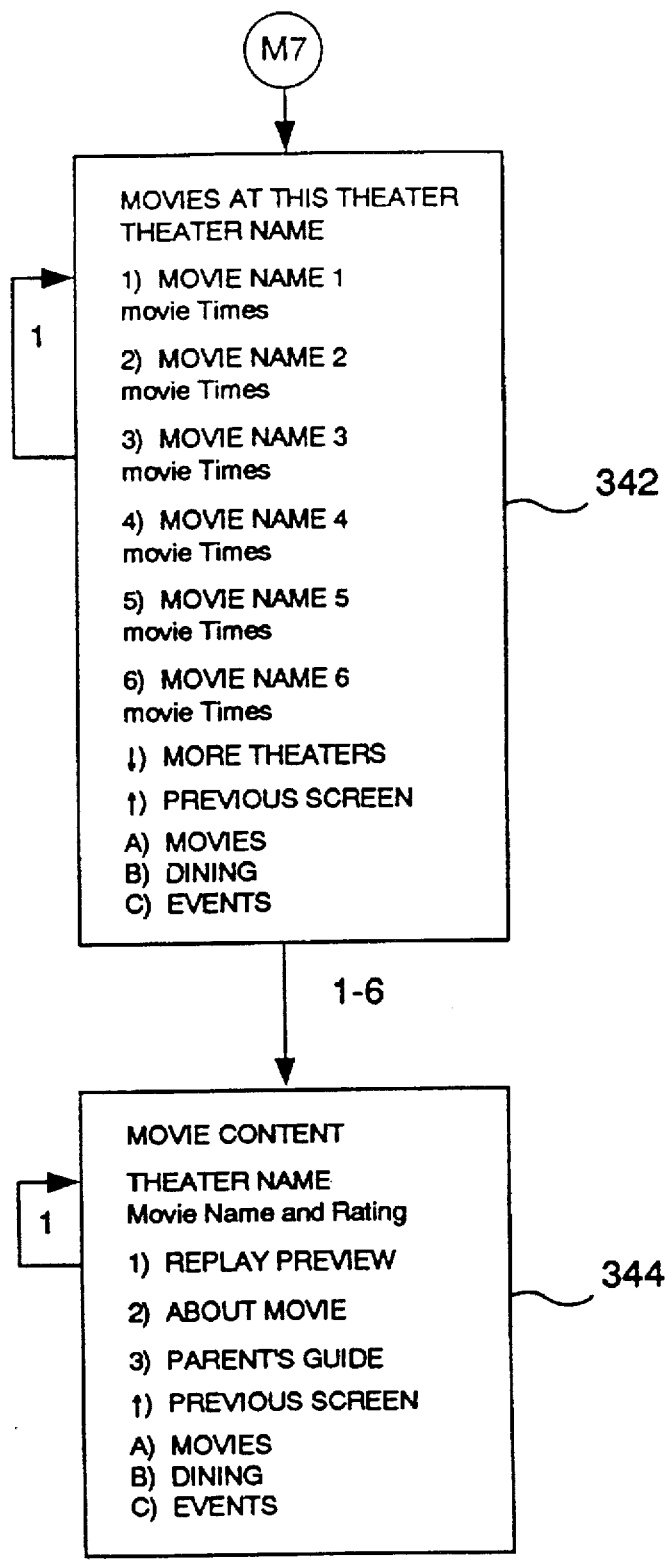

Referring now to FIGS. 3d and 3e, there is illustrated the processing steps associated with a user request to find a current re-released movie.

Upon receiving a user selection of "1" from block 312 indicating a user request to find a movie based on the movie title, CPE 114 will process block 330. According to block 330, CPE 114 will display a menu including ranges of alphabetic characters as shown in block 330.

Upon receiving a user selection of "2" from the menu of block 312 indicating a user request to find a movie based on movie type, CPE 114 will process block 332. According to block 332, CPE 114 will display a menu including a list of movie types. Blocks 330 and 332 are intended to enable the user to define movie search criteria.

These menus incorporate the "✓" function. Selected criteria from these menus are identified by "✓" which indicates the search criteria previously selected by She user. To undo the selections from a menu incorporating the "✓" function, such as menus 330 and 332, the user may press the "0" key of remote controller 120. To modify the search criteria on a menu incorporating the "✓" function, the user may press the "8" key of the remote controller 120.

Upon identifying search criteria at blocks 330 and 332, the CPE 114 will process block 334. According to block 334, CPE 114 will display a list of movies which meet the search criteria identified by the user. The movie list includes up to six movie titles. If the list of movie titles exceeds six entries, the user may view additional entries by pressing the "↓" or "↑" keys of remote controller 120. As shown in FIGS. 3d and 3e, selecting a movie from the list of movies causes CPE 114 to process block 320 as previously described in relation to FIG. 3b.

Upon receiving a user selection of "3" from the menu of block 312 indicating a user request to find a movie based on theater location, CPE 114 will process block 336. According to block 336, CPE 114 will display a menu including geographic regions. This menu enables the user to identify a geographically desirable theater. The theater location processing illustrated in blocks 336–334 are conceptually similar to the processing blocks relating to identifying a current release.

Requests For Dining

Figure 4A:
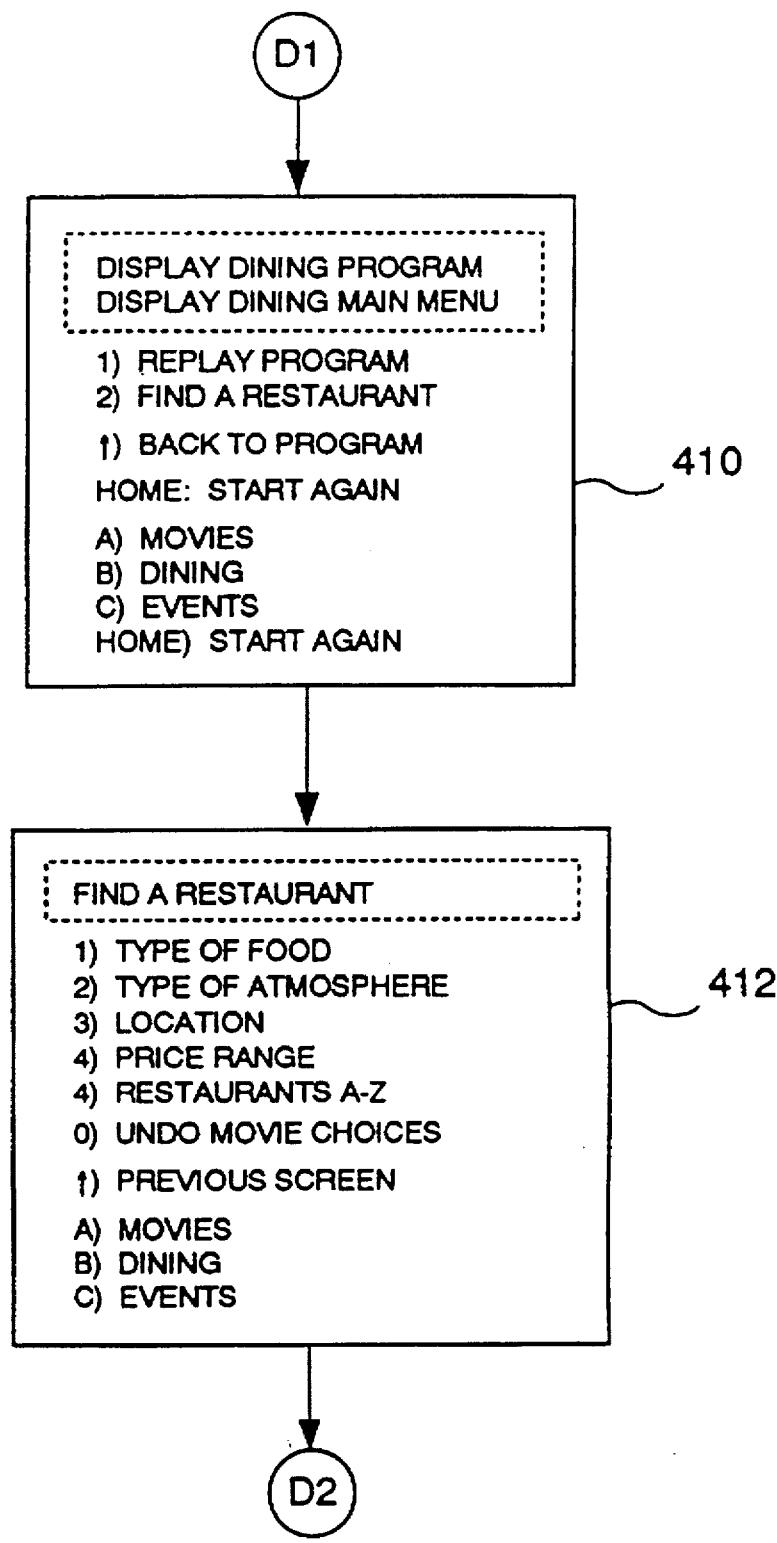
FIGS. 4a and 4b are flow charts illustrating the processing of user requests related to dining.
Figure 4C:
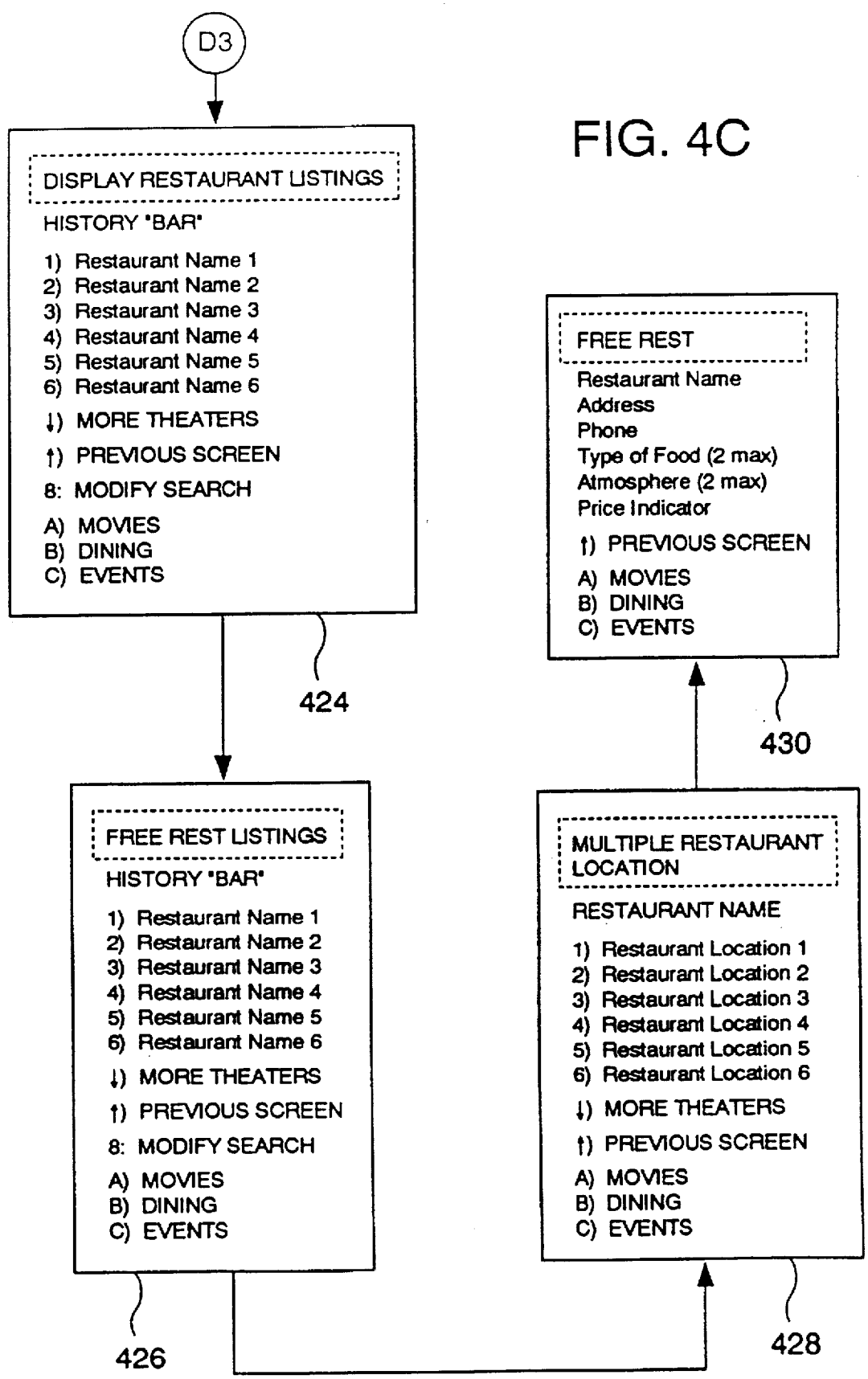

Referring now to FIGS. 4a and 4c, there is illustrated the processing steps associated with a user request for information related to dining.

Upon receiving a user selection of "B" from the GO-TV main menu, indicating a request for information related to dining, CPE 114 will process Block 410. According to Block 410, CPE 114 will request and display a program related to a featured restaurant topic on Monitor 116. CPE 114 will further display the dining main menu options listed in Block 410.

Upon receiving a user selection of "2" from the dining main menu, CPE 114 will process Block 412. According to Block 412, CPE 114 will display the find a restaurant menu on Monitor 116. The processing steps required to implement the find a restaurant functionality of the present invention are described at Blocks 412 through 430. The find a restaurant processing illustrated in these blocks is conceptually similar to the processing blocks related to finding a movie as previously discussed.

A number of restaurant search criteria can be defined by the user. The search criteria includes food type, atmosphere type, location, price range and restaurant name. The processing steps associated with selecting the restaurant search criteria are illustrated at Blocks 414 through 422.

Requests For Events

Figure 5B:
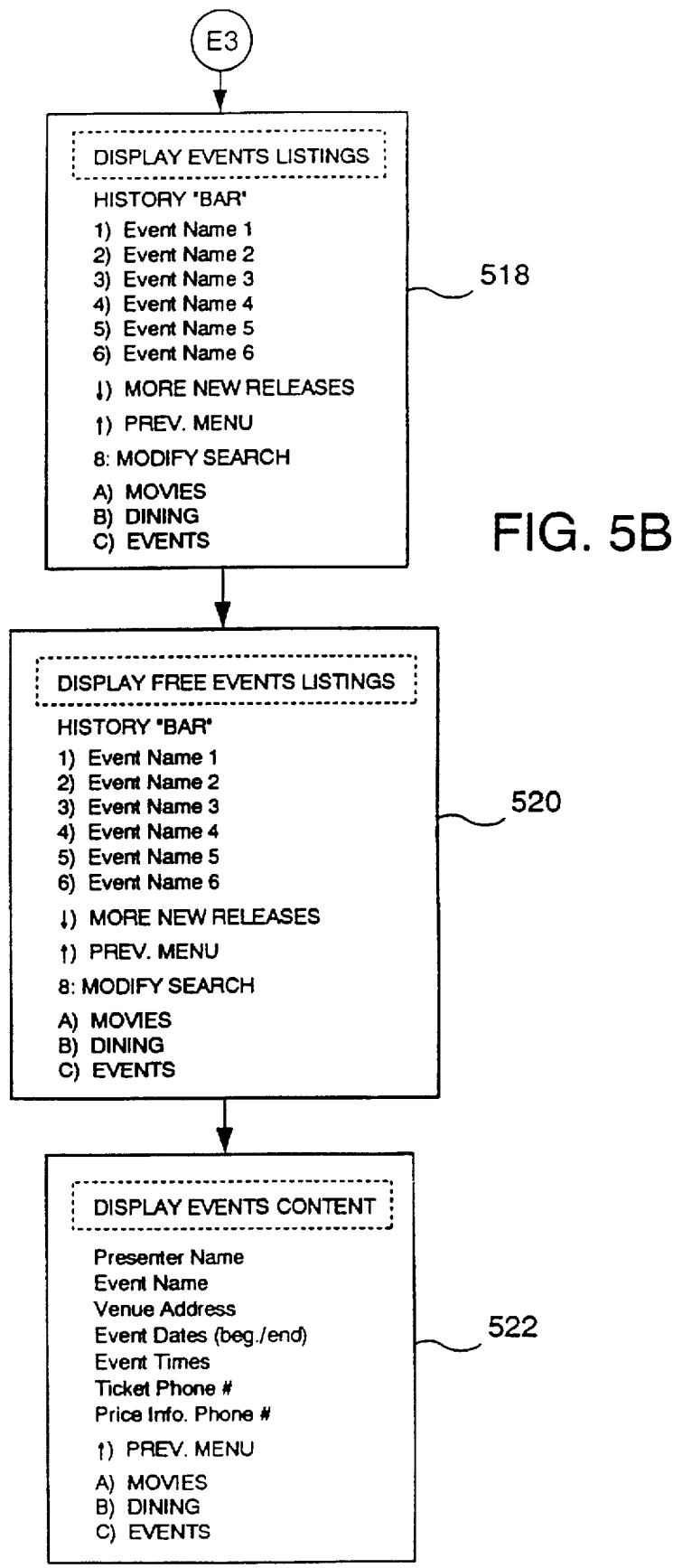
Figure 5C:
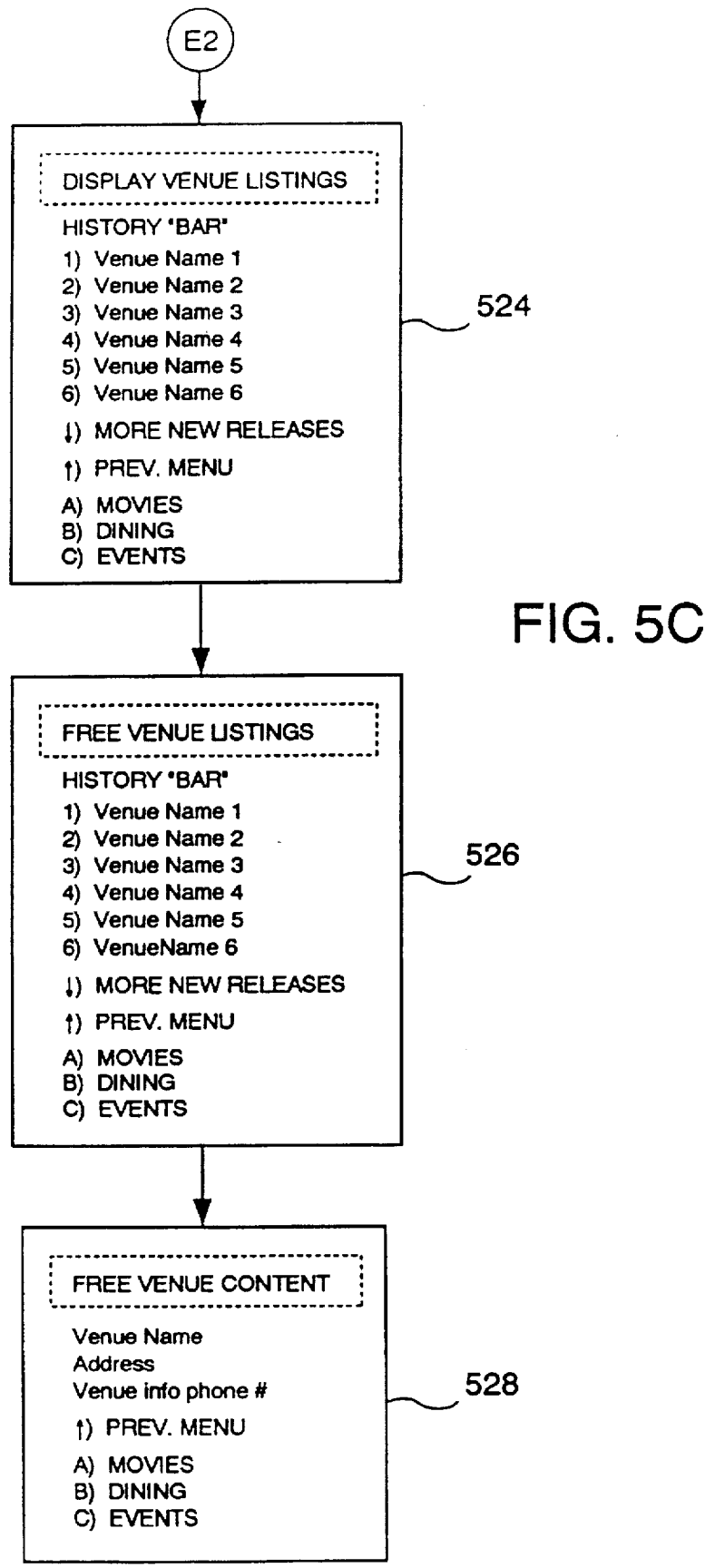

Referring now to FIGS. 5a–5b, there is illustrated the processing steps associated with a user request for information related to events.

Upon receiving a user selection of "C" from the GO-TV main menu, indicating a request for information related to events, CPE 114 will process Block 510. According to Block 510, CPE 114 will request and display a program related to a featured event topic on monitor 116. CPE 114 will further display the event main menu options listed in block 510.

Upon receiving a user selection from the dining main menu, CPE 114 will execute the processing steps illustrated in blocks 512–522. The processing required to implement the "find an event" functionality of the present invention, are described at blocks 512–528. The "find-an-event" processing illustrated in these blocks is conceptually similar to the processing blocks related to finding a movie, as previously discussed.

A number of event search criteria can be defined by the user. The search criteria include activities, calendar, event location and venue.

Advertising

The interactive interface of the present invention also incorporates two types of advertising: nested intrusive multimedia advertising, and context-specific customized advertising. Each of these advertising types includes passive advertising, as well as interactive advertising.

Nested intrusive multimedia advertising is advertising which is not selected for display by the user. For example, CPE 114 upon transferring control to block 212, may cause a multimedia advertisement to be displayed on monitor 116 prior to displaying the introductory program. CPE 114 provides the facility for a user to ignore the intrusive advertising by processing any user request received during the advertisement.

It is envisioned further that the nested intrusive multimedia advertising is displayed by CPE 114 only upon the first occurrence of each menu. Whether or not to display an advertisement every time the menu is displayed is a design choice which is implementation specific.

The second type of advertising provided by the present invention is context specific customized advertising. This type of advertising is selected by the user based on menu choices previously described. For example, upon locating a restaurant, a user may wish additional information regarding the identified restaurant. By selecting the restaurant name from the menu of block 424, CPE 114 will request and display a promotional advertisement related to the identified restaurant. In this way, the user is provided information on demand related to her selections.

It is envisioned that regardless of the type of advertising presented to the user that CPE 114 will provide, at the user's request, fully interactive advertising. Interactive advertising allows the user to identify products and services of interest, minimizing the advertising time while maximizing information the user finds significant.

Figure 6D:
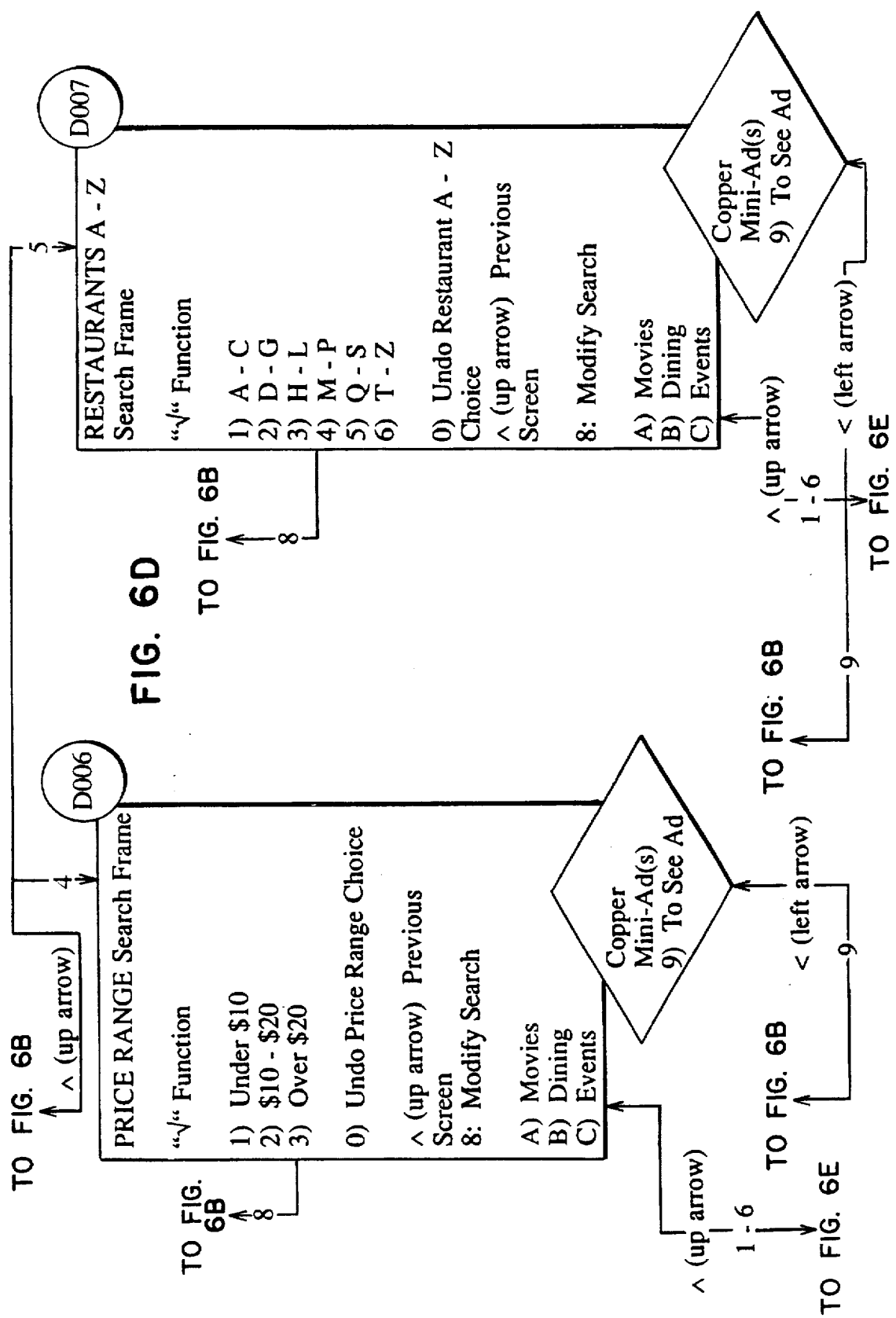
FIGS. 6a–6t are flow charts depicting the complete GO-TV interface.
Figure 6F:
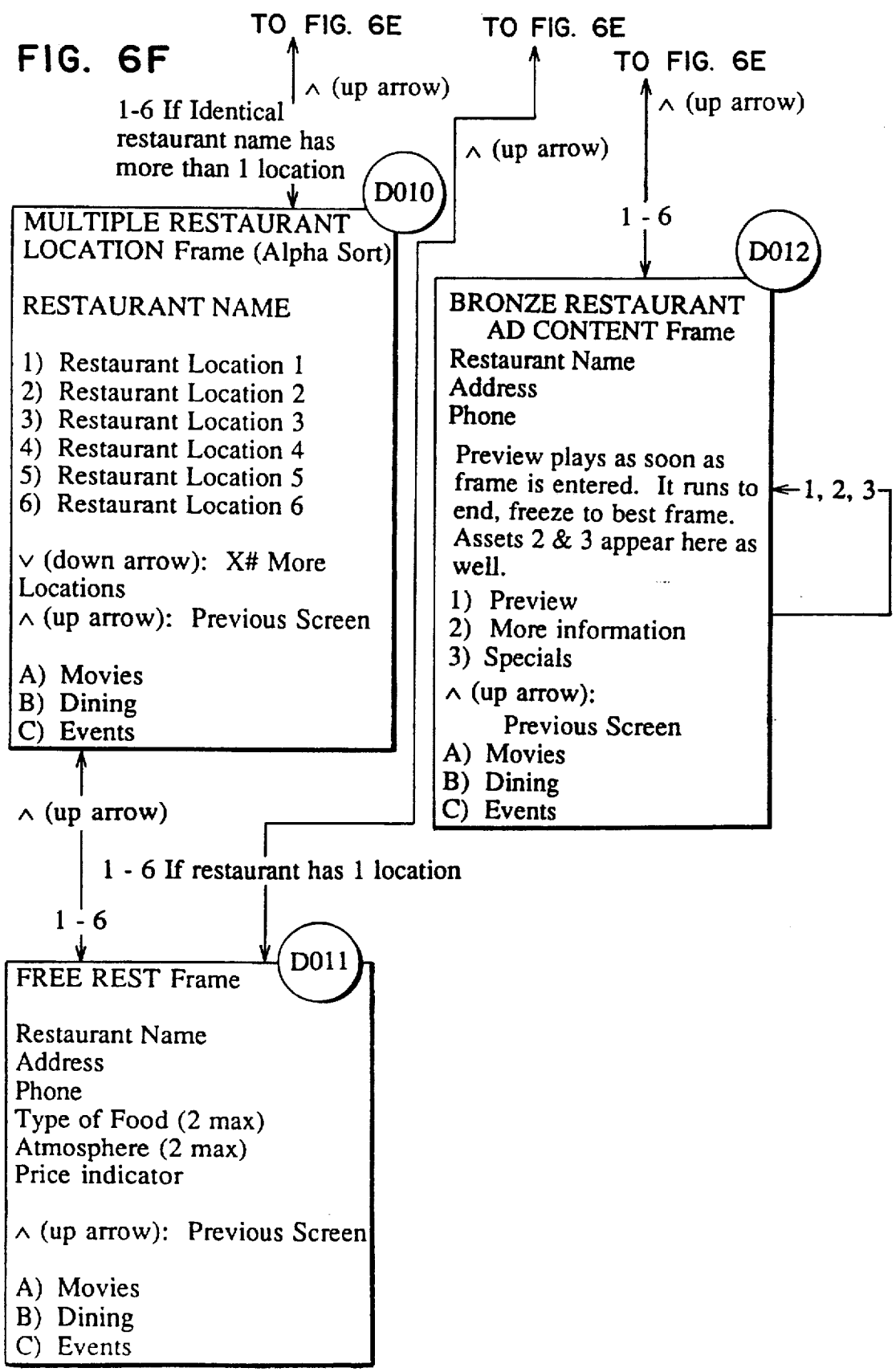
Figure 6G:
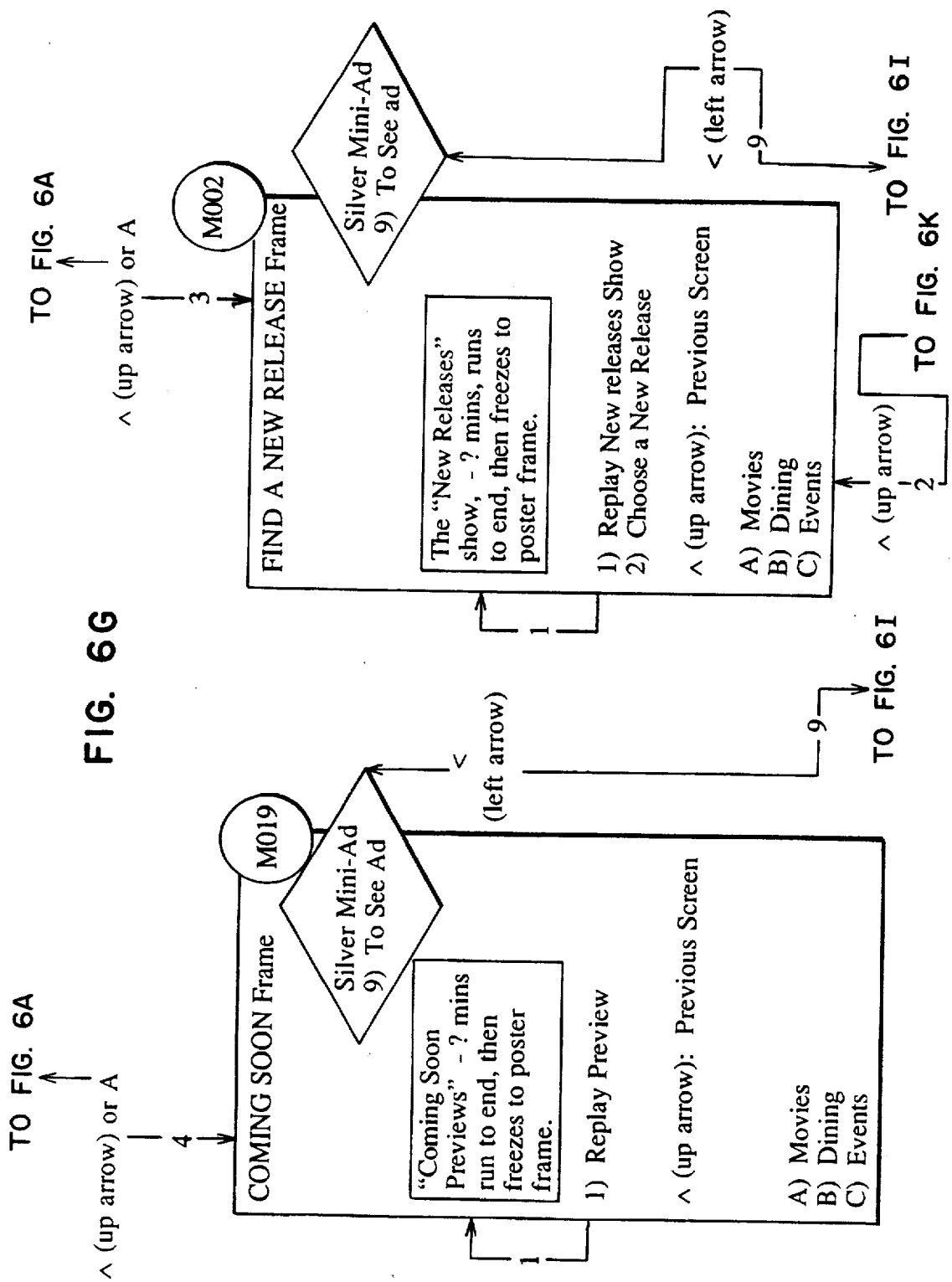
Figure 6I:
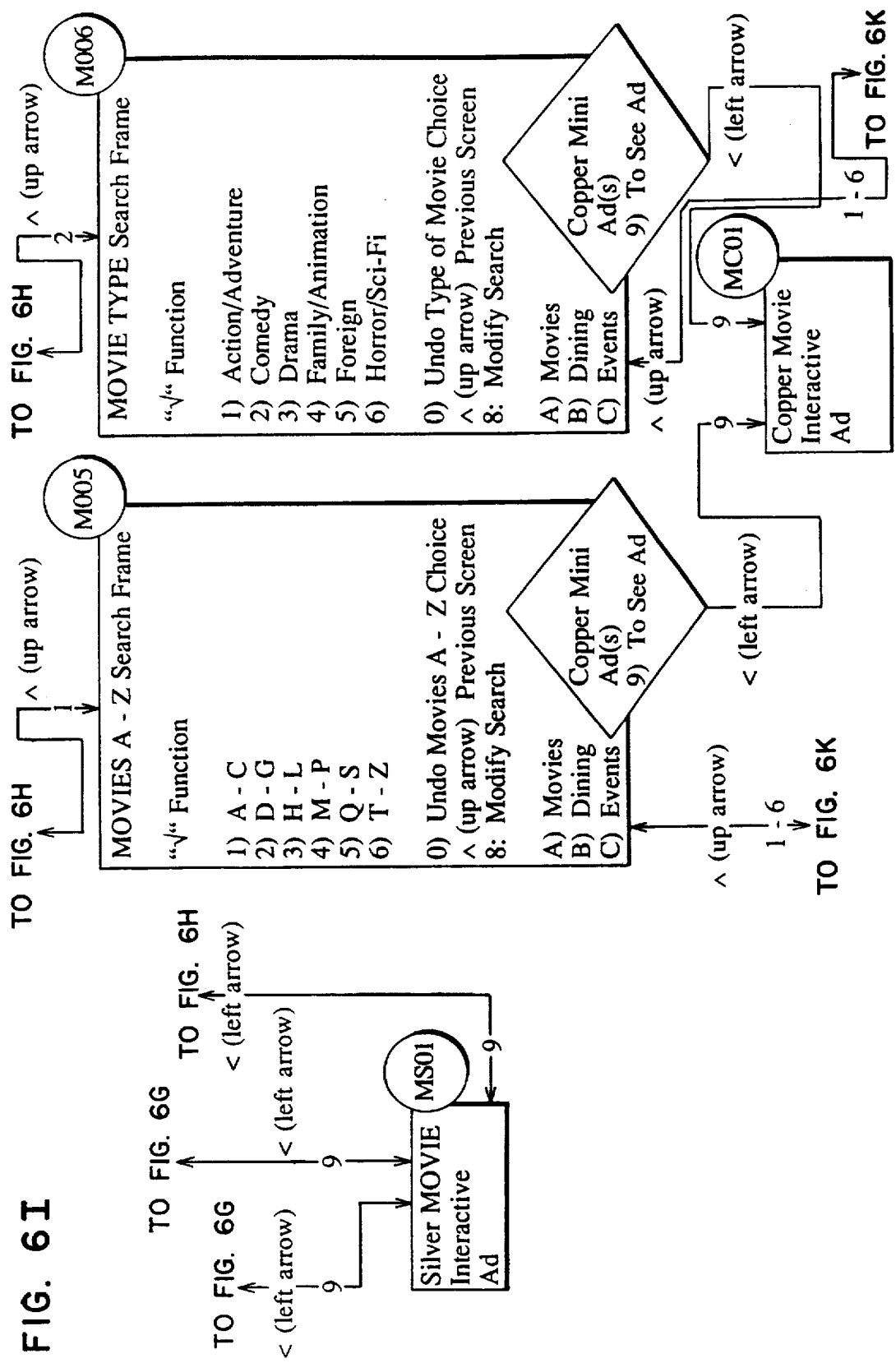
Figure 6L:
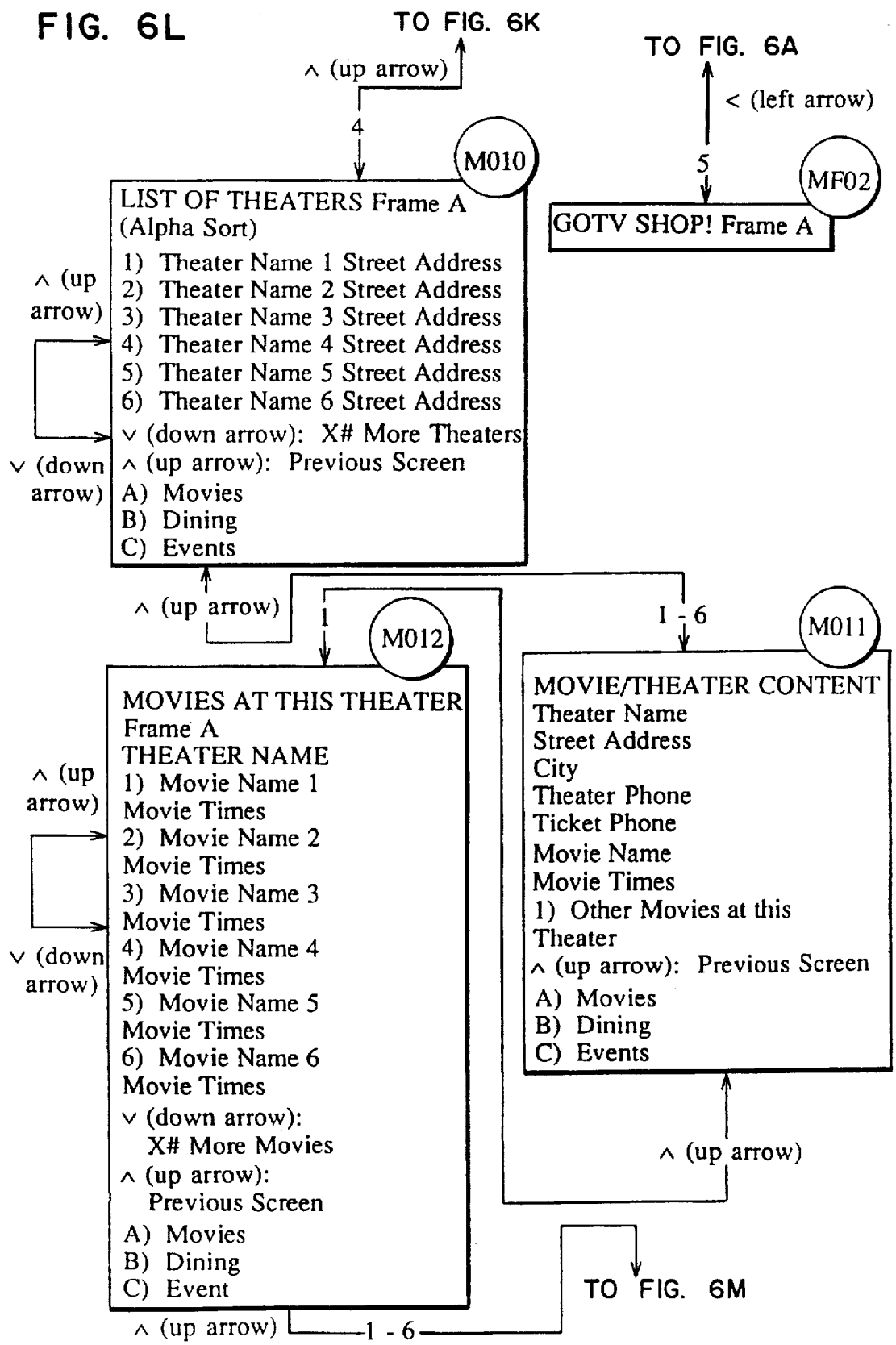
Figure 6M:
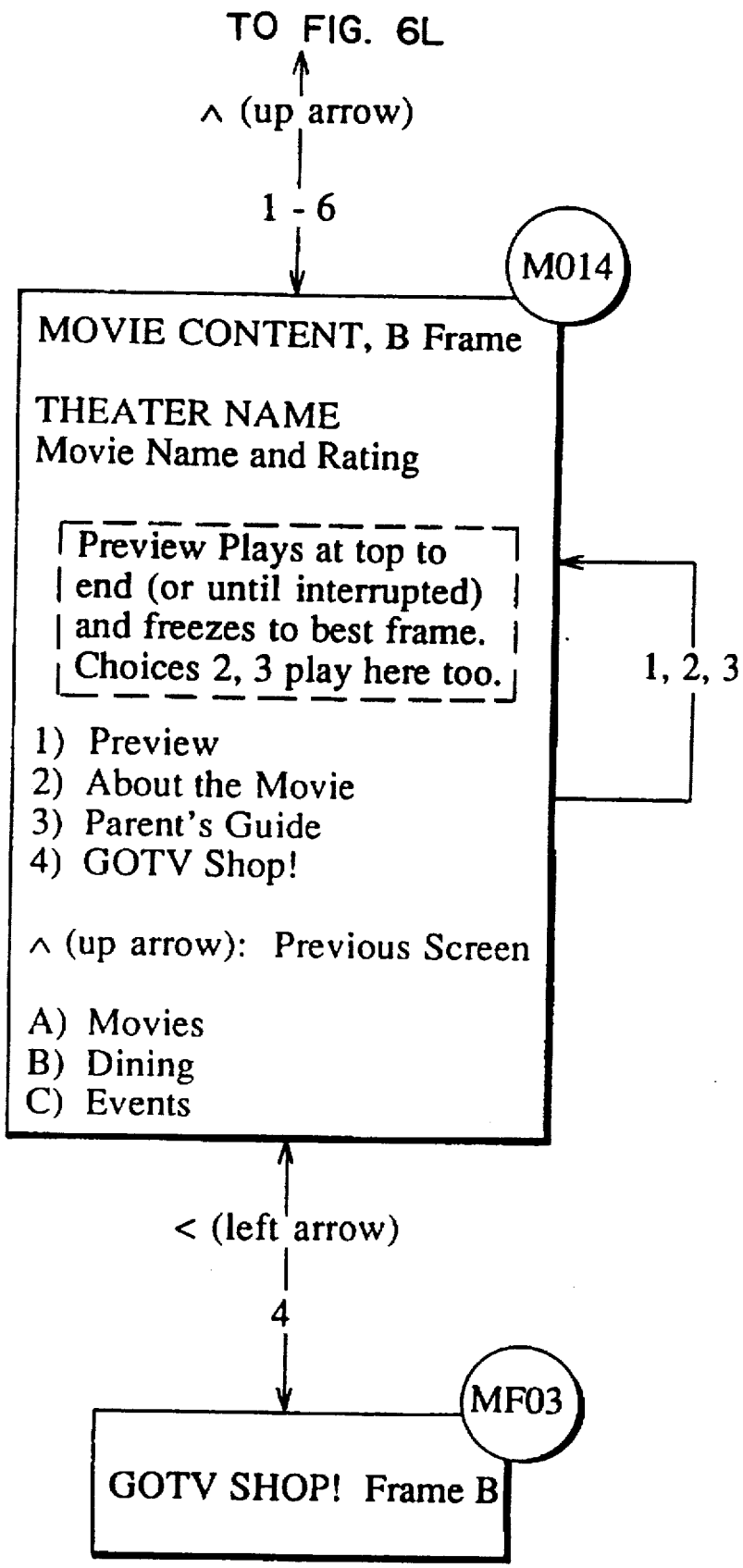
Figure 6O:
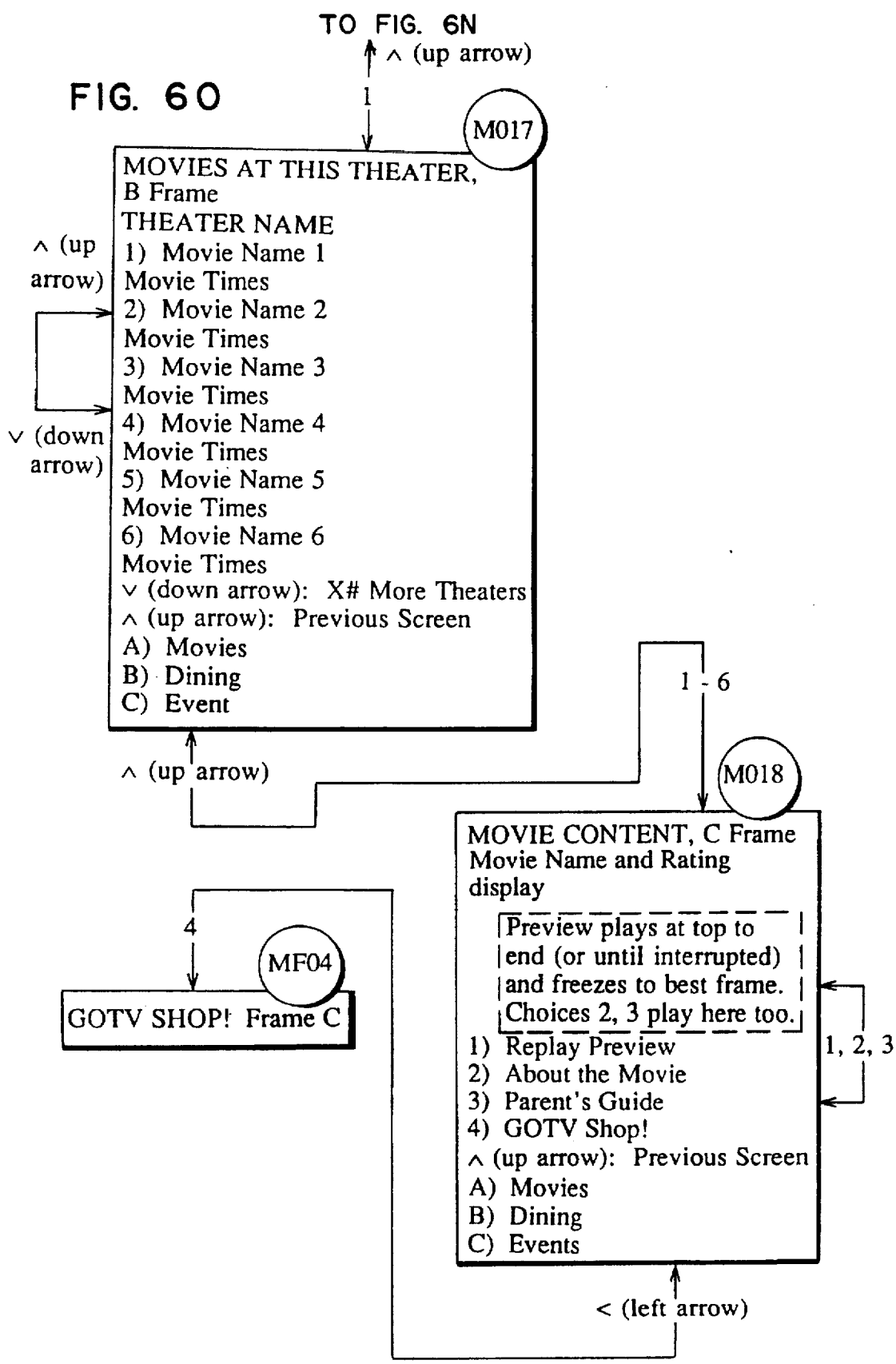
Figure 6P:
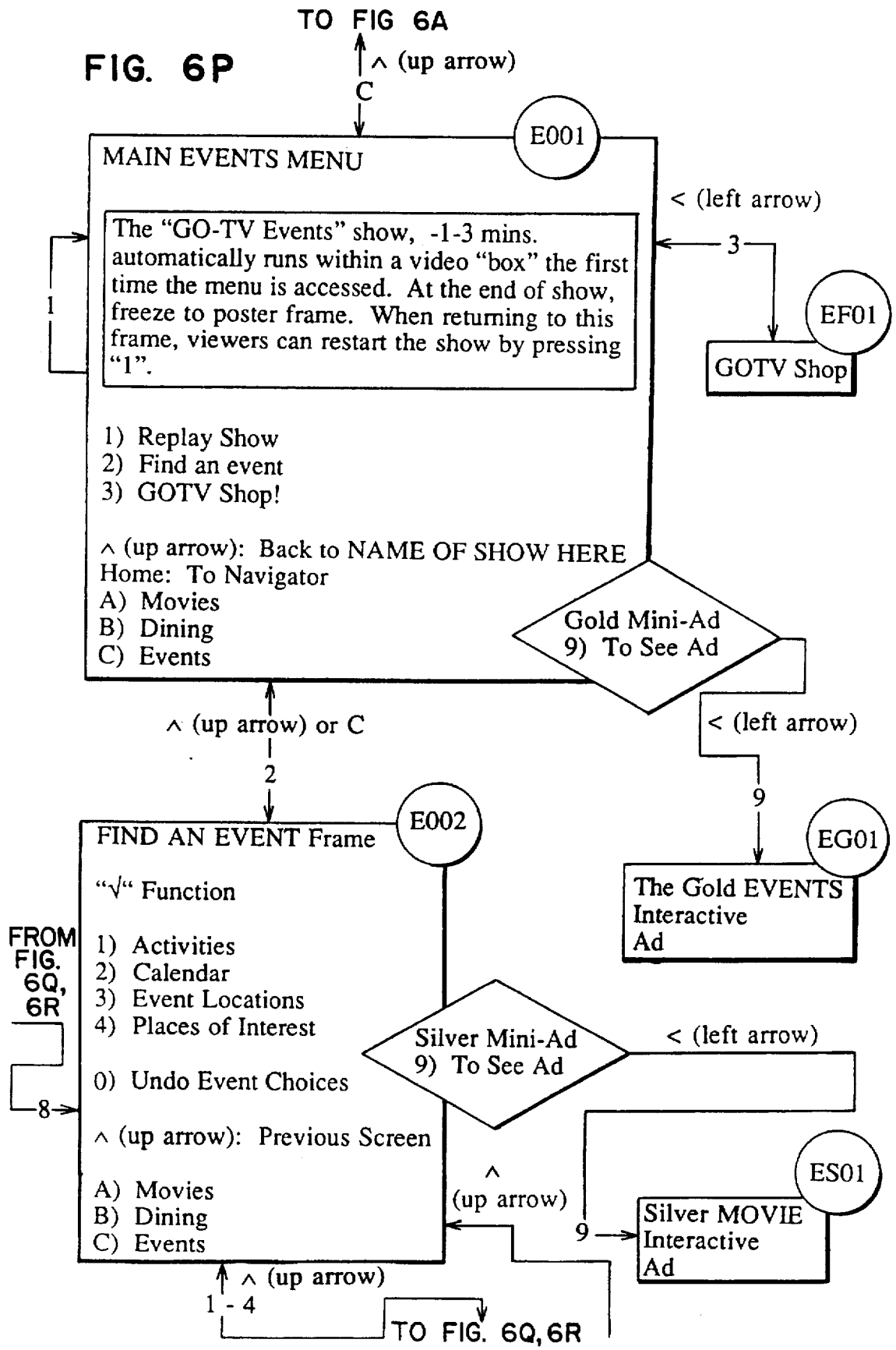

The complete flow chart of the GO-TV interface is depicted in FIGS. 6a–6t.

While the Best Mode For Carrying Out The Invention has been described in detail, those familiar with the art to which this invention relates will recognize various alternative designs and embodiments before practicing the invention as defined by the following claims.

What is claimed is:

1. In an interactive multi-media information system comprising a server having storage, said server in communication with a plurality of remote client subscriber stations, each subscriber station comprising a set-top having a processor and a memory, a display device coupled to the set-top, and an input device, in communication with the subscriber station, having a plurality of keys, a method for processing selections identified by a user utilizing the input device, the method comprising the steps of:

having a user request, via a remote subscriber station, a first set of digital data representing a first multi-media program from the server;

retrieving from the storage on the server the first multi-media program in response to the user request;

displaying the first multi-media program on the display device;

prompting the user to select a request for multi-media information by pressing a key on the input device;

receiving, at the server, a signal representing the pressed key;

retrieving from the storage on the server the requested multi-media information as a function of the received signal; and displaying the requested multi-media information on the display device.

2. The method of claim 1 wherein the multi-media information is a list of at least one restaurant.

3. The method of claim 2 further including the steps of:

prompting the user to select restaurant search parameters utilizing the input device;

receiving, at the server, signals representing the selected restaurant search parameters;

retrieving from the storage on the sewer data representing a list of one or more restaurants as a function of the selected restaurant search parameters; and displaying on the display device the list of restaurants.

4. The method of claim 3 wherein the restaurant search parameters are selected from the group consisting of food type, restaurant atmosphere, geographic location, average price range, and restaurant name.

5. The method of claim 1 wherein the multi-media information is a list of at least one movie.

6. The method of claim 5 further including the steps of:

prompting the user to select movie search parameters utilizing the input device;

receiving, at the server, signals representing the selected movie search parameters;

retrieving from the storage on the server data representing a list of one or more movies as a function of the selected movie search parameters; and displaying on the display device the list of movies.

7. The method of claim 6 wherein movie search parameters are selected from the group consisting of movie type, movie title, and theater location.

8. The method of claim 1 wherein the multi-media information is an electronic parents guide comprising video segments of sexually explicit or violent scenes in a movie.

9. The method of claim 1 wherein the multi-media information is previews of motion pictures.

10. The method of claim 1 wherein the multi-media information is information relating to motion picture production.

11. The method of claim 1 wherein the multi-media information provides information to select a ticket for an event.

12. The method of claim 1 wherein the display device is a TV.

13. In an interactive multi-media information system comprising a server and a plurality of remote client subscriber stations operatively coupled to the server, each subscriber supporting one or more user sessions, a method for displaying multimedia information in two or more user sessions, the method comprising the steps of:

starting a first user session;

sorting multimedia information in a first sequence;

displaying the multimedia information in the first sequence on the display device in the first user session;

starting a second user session;

sorting the multimedia information in a second sequence;

displaying the multimedia information in the second sequence on the display device in the second user session.

14. The method of claim 1 wherein the first sequence is an alphabetical sequence of the multimedia information.

15. In an interactive multi-media information system comprising a server having storage, said server in communication with a plurality of remote client subscriber stations, each subscriber station comprising a set-top having a processor and a memory, a display device coupled to the set-top, and an input device in communication with the subscriber station, having a plurality of keys, a method for processing selections identified by a user utilizing the input device, the method comprising the steps of:

requesting, via a remote subscriber station, a first set of digital data representing a first multi-media program from the server;

retrieving from the storage on the server the first multi-media program;

displaying the first multi-media program on the display device;

prompting the user to select a request for multi-media information by pressing a key on the input device;

receiving, at the server, a signal representing the pressed key;

retrieving from the storage on the server the requested multi-media information as a function of the received signal;

displaying the requested multi-media information on the display device: and wherein the first sequence is an alphabetical sequence of the multimedia information and the second sequence is derived from the first sequence by rotating the first sequence.

16. In an interactive multi-media information system comprising a display device, a method for displaying multimedia information, the method comprising the steps of:

defining a first set of multimedia information, wherein the first set of multimedia information comprises information associated with paying advertisers;

defining a second set of multimedia information, wherein the second set of multimedia information comprises information associated with free advertisements;

displaying the a first set of multimedia information on a first page on the display device; and displaying the a second set of multimedia information on a second page on the display device, said second page accessible by scrolling a window in the display device.

* * * * *